(12) United States Patent
Arase et al.

(10) Patent No.: US 12,311,551 B2
(45) Date of Patent: May 27, 2025

(54) CONTROLLER AND CONTROL METHOD FOR ROBOTIC SYSTEM

(71) Applicant: MUJIN, Inc., Tokyo (JP)

(72) Inventors: Isamu Arase, Tokyo (JP); Satoshi Tendo, Tokyo (JP); Rosen Nikolaev Diankov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

(21) Appl. No.: 17/318,962

(22) Filed: May 12, 2021

(65) Prior Publication Data

US 2021/0260762 A1 Aug. 26, 2021

Related U.S. Application Data

(63) Continuation of application No. 16/886,734, filed on May 28, 2020, now Pat. No. 11,077,554, which is a continuation-in-part of application No. 16/428,645, filed on May 31, 2019, now Pat. No. 10,696,493, and a continuation-in-part of application No. 16/428,714, filed on May 31, 2019, now Pat. No. 10,679,379, and a continuation-in-part of application No. 16/428,870,
(Continued)

(30) Foreign Application Priority Data

Nov. 19, 2019 (JP) .................. 2019-208587

(51) Int. Cl.
*G06F 7/00* (2006.01)
*B25J 9/16* (2006.01)
(52) U.S. Cl.
CPC ................... *B25J 9/1664* (2013.01)

(58) Field of Classification Search
CPC ....... B25J 9/1664; B25J 9/1687; B65G 65/00; B65G 61/00; G05B 19/41895; G05B 2219/40006; Y02P 90/02; Y02P 90/60
USPC ......................................... 700/213–217, 228
See application file for complete search history.

(56) References Cited

U.S. PATENT DOCUMENTS 3,586,176 A 6/1971 Rackman et al.
3,856,176 A 12/1974 Carter
(Continued)

FOREIGN PATENT DOCUMENTS

CA 2472434 A1 10/2005
CN H04201926 A 7/1992
(Continued)

OTHER PUBLICATIONS

Non-Final Office Action dated Jul. 25, 2019 for U.S. Appl. No. 16/428,645, filed May 31, 2019, 8 pages.
(Continued)

*Primary Examiner* — Yolanda R Cumbess
(74) *Attorney, Agent, or Firm* — Perkins Coie LLP

(57) ABSTRACT

A controller for a robotic system is provided. The controller may derive first data including information about operation objects and information about pallet before loading and/or unloading of the operation object on/from the pallet. The controller may derive a control sequence for loading and/or unloading the operation object on/from the pallet based on the first data before execution of the corresponding loading/unloading task. Based on the control sequence, the controller may instruct a robot to execute the task of loading and/or unloading the operation object on/from the pallet.

25 Claims, 9 Drawing Sheets

Related U.S. Application Data filed on May 31, 2019, now Pat. No. 10,647,528, and a continuation-in-part of application No. 16/428,809, filed on May 31, 2019, now Pat. No. 10,618,172, and a continuation-in-part of application No. 16/428,843, filed on May 31, 2019, now Pat. No. 10,696,494.

(56) References Cited

U.S. PATENT DOCUMENTS

| | | | |
|---|---|---|---|
| 4,641,271 A | 2/1987 | Konishi et al. | |
| 4,676,050 A | 6/1987 | Odenthal | |
| 4,692,876 A * | 9/1987 | Tenma | G06Q 10/08 901/7 |
| 5,079,699 A | 1/1992 | Tuy et al. | |
| 5,175,692 A | 12/1992 | Mazouz et al. | |
| 5,501,571 A | 3/1996 | Van Durrett et al. | |
| 5,908,283 A | 6/1999 | Huang et al. | |
| 6,055,462 A | 4/2000 | Sato | |
| 7,266,422 B1 * | 9/2007 | DeMotte | B25J 9/1687 414/801 |
| 8,290,617 B2 | 10/2012 | Ruge | |
| 9,089,969 B1 | 7/2015 | Theobald | |
| 9,102,055 B1 | 8/2015 | Konolige et al. | |
| 9,205,558 B1 | 12/2015 | Zevenbergen et al. | |
| 9,205,562 B1 | 12/2015 | Konolige et al. | |
| 9,315,344 B1 | 4/2016 | Lehmann | |
| 9,333,649 B1 * | 5/2016 | Bradski | B25J 19/00 |
| 9,393,693 B1 | 7/2016 | Kalakrishnan et al. | |
| 9,424,470 B1 | 8/2016 | Hinterstoisser | |
| 9,457,477 B1 | 10/2016 | Rublee et al. | |
| 9,457,970 B1 | 10/2016 | Zevenbergen et al. | |
| 9,688,489 B1 | 6/2017 | Zevenbergen et al. | |
| 9,714,145 B1 | 7/2017 | Lehmann | |
| 9,821,463 B2 | 11/2017 | Kuffner, Jr. et al. | |
| 9,826,213 B1 * | 11/2017 | Russell | B65G 69/00 |
| 9,866,815 B2 | 1/2018 | Vrcelj et al. | |
| 9,926,138 B1 | 3/2018 | Brazeau et al. | |
| 9,969,571 B1 | 5/2018 | Lehman | |
| 10,019,015 B2 | 7/2018 | Johnson et al. | |
| 10,124,489 B2 | 11/2018 | Chitta et al. | |
| 10,198,008 B2 | 2/2019 | Ueda et al. | |
| 10,252,870 B2 | 4/2019 | Kimoto et al. | |
| 10,335,947 B1 | 7/2019 | Diankov et al. | |
| 10,549,928 B1 * | 2/2020 | Chavez | B25J 9/1687 |
| 10,618,172 B1 | 4/2020 | Diankov et al. | |
| 10,647,528 B1 | 5/2020 | Diankov et al. | |
| 10,679,379 B1 | 6/2020 | Diankov et al. | |
| 10,696,493 B1 | 6/2020 | Diankov et al. | |
| 10,696,494 B1 | 6/2020 | Diankov et al. | |
| 10,953,549 B2 | 3/2021 | Diankov et al. | |
| 11,077,554 B2 | 8/2021 | Arase et al. | |
| 11,173,602 B2 | 11/2021 | Ohdner et al. | |
| 11,319,166 B2 | 5/2022 | Diankov et al. | |
| 11,472,640 B2 | 10/2022 | Diankov et al. | |
| 11,488,323 B2 | 11/2022 | Diankov et al. | |
| 11,591,168 B2 | 2/2023 | Diankov et al. | |
| 2002/0057838 A1 | 5/2002 | Steger | |
| 2003/0110102 A1 | 6/2003 | Chien et al. | |
| 2004/0074823 A1 | 4/2004 | Brust et al. | |
| 2004/0120600 A1 | 6/2004 | Cho et al. | |
| 2005/0246056 A1 | 11/2005 | Marks et al. | |
| 2008/0030497 A1 | 2/2008 | Hu et al. | |
| 2008/0131255 A1 | 6/2008 | Hessler et al. | |
| 2008/0273801 A1 | 11/2008 | Podilchuk | |
| 2009/0069939 A1 | 3/2009 | Nagatsuka et al. | |
| 2009/0138121 A1 | 5/2009 | Wicks et al. | |
| 2010/0178149 A1 | 7/2010 | Fritzsche | |
| 2010/0222915 A1 | 9/2010 | Kuehnemann et al. | |
| 2010/0249989 A1 | 9/2010 | Baldes et al. | |
| 2011/0013809 A1 | 1/2011 | Abe | |
| 2011/0122231 A1 | 5/2011 | Fujieda et al. | |
| 2013/0163879 A1 | 6/2013 | Katz et al. | |
| 2013/0282165 A1 | 10/2013 | Pankratov et al. | |
| 2013/0345870 A1 | 12/2013 | Buehler et al. | |
| 2014/0180479 A1 | 6/2014 | Argue et al. | |
| 2014/0374216 A1 | 12/2014 | Pierson et al. | |
| 2015/0073588 A1 | 3/2015 | Priebe et al. | |
| 2015/0166272 A1 | 6/2015 | Pankratov et al. | |
| 2016/0016311 A1 * | 1/2016 | Konolige | B25J 9/1664 901/30 |
| 2016/0063309 A1 | 3/2016 | Konolige et al. | |
| 2016/0200516 A1 | 7/2016 | Baker | |
| 2016/0288330 A1 | 10/2016 | Konolige | |
| 2016/0371850 A1 | 12/2016 | Kwon et al. | |
| 2017/0039304 A1 | 2/2017 | Kim et al. | |
| 2017/0080566 A1 | 3/2017 | Stubbs et al. | |
| 2017/0107055 A1 * | 4/2017 | Magens | G05D 1/021 |
| 2017/0134680 A1 | 5/2017 | Zhong et al. | |
| 2017/0246744 A1 * | 8/2017 | Chitta | B25J 9/1687 |
| 2017/0267467 A1 | 9/2017 | Kimoto et al. | |
| 2018/0060765 A1 | 3/2018 | Hance et al. | |
| 2018/0065818 A1 | 3/2018 | Gondoh et al. | |
| 2018/0304468 A1 | 10/2018 | Holz | |
| 2018/0312346 A1 | 11/2018 | Klotz et al. | |
| 2019/0016543 A1 | 1/2019 | Turpin et al. | |
| 2019/0039237 A1 | 2/2019 | Nakashima et al. | |
| 2019/0061151 A1 | 2/2019 | Namiki | |
| 2019/0114250 A1 | 4/2019 | Pugh | |
| 2019/0143504 A1 | 5/2019 | Kimoto | |
| 2019/0193956 A1 | 6/2019 | Morland et al. | |
| 2019/0197695 A1 | 6/2019 | Itakura | |
| 2020/0377311 A1 | 12/2020 | Diankov et al. | |
| 2020/0377312 A1 | 12/2020 | Diankov et al. | |
| 2020/0377315 A1 | 12/2020 | Diankov et al. | |
| 2020/0380722 A1 | 12/2020 | Diankov et al. | |
| 2021/0214163 A1 | 7/2021 | Deacon et al. | |
| 2021/0237274 A1 | 8/2021 | Diankov et al. | |
| 2022/0219916 A1 | 7/2022 | Diankov et al. | |
| 2023/0008946 A1 | 1/2023 | Diankov et al. | |
| 2023/0016733 A1 | 1/2023 | Diankov et al. | |
| 2023/0278811 A1 | 9/2023 | Diankov et al. | |

FOREIGN PATENT DOCUMENTS

| | | |
|---|---|---|
| CN | 1277591 | 12/2000 |
| CN | 101145051 A | 3/2008 |
| CN | 20180460 U | 4/2011 |
| CN | 102556523 A | 7/2012 |
| CN | 102725703 B | 10/2012 |
| CN | 103350908 A | 10/2013 |
| CN | 103640729 A | 3/2014 |
| CN | 103988214 B | 8/2014 |
| CN | 105691717 A | 6/2016 |
| CN | 107885901 A | 4/2018 |
| CN | 108064197 A | 5/2018 |
| CN | 207374734 U | 5/2018 |
| CN | 108748136 A | 11/2018 |
| CN | 108776879 A | 11/2018 |
| CN | 109132313 A | 1/2019 |
| CN | 109353833 A | 2/2019 |
| CN | 109359739 A | 2/2019 |
| CN | 109382822 A | 2/2019 |
| CN | 112009810 A | 12/2020 |
| DE | 69221658 T2 | 9/1997 |
| DE | 10352279 A1 | 6/2005 |
| DE | 69730758 T2 | 9/2005 |
| DE | 102009011294 A1 | 9/2010 |
| DE | 102009011300 A1 | 9/2010 |
| DE | 102014005758 B4 | 10/2014 |
| DE | 102007001263 B4 | 7/2015 |
| DE | 102016013497 A1 | 5/2017 |
| DE | 102017105082 | 9/2017 |
| DE | 102017122361 A1 | 3/2018 |
| DE | 112011105151 B4 | 9/2018 |
| DE | 102018006465 A1 | 2/2019 |
| DE | 2018008744 A1 | 5/2019 |
| EP | 0507375 A2 | 8/1997 |
| EP | 2314425 A2 | 4/2011 |
| EP | 2769341 B1 | 8/2014 |
| EP | 3104313 A1 | 12/2016 |
| EP | 3437807 A2 | 2/2019 |
| JP | S61033426 A | 2/1986 |
| JP | 62019963 A | 1/1987 |
| JP | S62251811 A | 11/1987 |

(56) References Cited

FOREIGN PATENT DOCUMENTS

| | | |
|---|---|---|
| JP | H03158322 A | 7/1991 |
| JP | H03162320 A | 7/1991 |
| JP | 3243528 A | 10/1991 |
| JP | H08118274 A | 5/1996 |
| JP | H10080881 A | 3/1998 |
| JP | 2000168958 A | 6/2000 |
| JP | 2001301946 A | 10/2001 |
| JP | 2002154616 A | 5/2002 |
| JP | 2002154620 A | 5/2002 |
| JP | 2003104563 A | 4/2003 |
| JP | 2003335417 A | 11/2003 |
| JP | 3586639 B2 | 11/2004 |
| JP | 2004307111 A | 11/2004 |
| JP | 2005089067 A | 7/2005 |
| JP | 2007179301 A | 7/2007 |
| JP | 2007246225 A | 9/2007 |
| JP | 2007254078 A | 10/2007 |
| JP | 2007291451 A | 11/2007 |
| JP | 2014021810 A | 7/2012 |
| JP | 2013086914 A | 5/2013 |
| JP | 2014530158 A | 11/2014 |
| JP | 2017094428 A1 | 6/2017 |
| JP | 2017165517 A | 9/2017 |
| JP | 2018008824 A | 1/2018 |
| JP | 2018052691 A | 4/2018 |
| JP | 2018136896 A | 8/2018 |
| JP | 2018525301 A | 9/2018 |
| JP | 2018167950 A | 11/2018 |
| JP | 2019025618 A | 2/2019 |
| JP | 2019085213 A | 6/2019 |
| JP | 2019531908 A | 11/2019 |
| KR | 101708150 B1 | 2/2017 |
| WO | 2017018113 A1 | 2/2017 |
| WO | 2017061632 A1 | 4/2017 |
| WO | 2018194765 A1 | 10/2018 |

OTHER PUBLICATIONS

Final Office Action dated Dec. 2, 2019 for U.S. Appl. No. 16/428,645, filed May 31, 2019, 8 pages.
Non-Final Office Action dated Sep. 11, 2019 for U.S. Appl. No. 16/428,714, filed May 31, 2019, 30 pages.
Notice of Allowance dated Aug. 29, 2019 for U.S. Appl. No. 16/428,809, filed May 31, 2019, 6 pages.
Notice of Allowance dated Dec. 11, 2019 for U.S. Appl. No. 16/428,809, filed May 31, 2019, 13 pages.
Non-Final Office Action dated Jul. 31, 2019 for U.S. Appl. No. 16/428,843, filed May 31, 2019, 15 pages.
Final Office Action dated Dec. 2, 2019 for U.S. Appl. No. 16/428,843, filed May 31, 2019, 7 pages.
Non-Final Office Action dated Aug. 2, 2019 for U.S. Appl. No. 16/428,870, filed May 31, 2019, 21 pages.
Notice of Allowance dated Jan. 24, 2020 for U.S. Appl. No. 16/428,870, filed May 31, 2019, 17 pages.
Notice of Allowance dated Mar. 11, 2020 for U.S. Appl. No. 16/428,645, filed May 31, 2019, 10 pages.
Notice of Allowance dated Mar. 12, 2020 for U.S. Appl. No. 16/428,714, filed May 31, 2019, 30 pages.
Notice of Allowance dated Mar. 12, 2020 for U.S. Appl. No. 16/428,843, filed May 31, 2019, 10 pages.
Non-Final Office Action dated Sep. 15, 2020 for U.S. Appl. No. 16/802,451, filed Feb. 26, 2020, 25 pages.
Notice of Allowance dated Jan. 12, 2021 for U.S. Appl. No. 16/886,734, filed May 28, 2020, 13 pages.
CIPO Office Action dated Dec. 28, 2020 for Chinese patent application No. 202010221047.6, 5 pages.
JPO Office Action dated Apr. 2, 2020 for Japanese patent application No. 2019-168905, 2 pages.
JPO Office Action dated Mar. 12, 2020 for Japanese patent application No. 2019-170230, 2 pages.
JPO Office Action dated Apr. 8, 2020 for Japanese patent application No. 2019-169752, 3 pages.
Notice of Allowance dated Oct. 23, 2020 for U.S. Appl. No. 16/802,451, filed Feb. 26, 2020, 10 pages.
CIPO Notice to Grant dated Mar. 2, 2021 for Chinese patent application No. 202010221047.6, 4 pages.
JPO Notice to Grant dated Apr. 14, 2020 for Japanese patent application No. 2019-168905, 3 pages.
JPO Notice to Grant dated Apr. 2, 2020 for Japanese patent application No. 2019-170230, 3 pages.
CIPO Office Action dated Dec. 28, 2020 for Chinese patent application No. 202010221046.1, 6 pages.
CIPO Office Action dated Mar. 1, 2021 for Chinese patent application No. 202010221046.1, 5 pages.
CIPO Office Action dated Jan. 18, 2021 for Chinese patent application No. 202010221092.1, 9 pages.
CIPO Notice to Grant dated Mar. 3, 2021 for Chinese patent application No. 202010221092.1, 4 pages.
JPO Notice to Grant dated Jun. 5, 2020 for Japanese patent application No. 2019-169752, 3 pages.
Notice of Allowance dated Feb. 9, 2021 for U.S. Appl. No. 16/802,451, filed Feb. 26, 2020, 13 pages.
CIPO Office Action dated Jan. 5, 2021 for Chinese patent application No. 202010221015.6, 6 pages.
CIPO Notice to Grant dated Mar. 2, 2021 for Chinese patent application No. 202010221015.6, 4 pages.
JPO Notice to Grant dated Feb. 10, 2020 for Japanese patent application No. 2019-169842, 3 pages.
JPO Office Action dated Jan. 21, 2020 for Japanese patent application No. 2019-169842, 5 pages.
CIPO Office Action dated Jan. 13, 2021 for Chinese patent application No. 202010205099.4, 6 pages.
CIPO Notice to Grant dated Feb. 20, 2021 for Chinese patent application No. 202010205099.4, 4 pages.
JPO Notice to Grant dated Jan. 21, 2020 for Japanese patent application No. 2019-169237, 3 pages.
Non-Final Office Action dated Sep. 28, 2020 for U.S. Appl. No. 16/886,734, filed May 28, 2020, 32 pages.
CIPO Notice to Grant dated Apr. 2, 2021 for Chinese patent application No. 202010221046.1, 4 pages.
Office Action dated May 4, 2020 for German patent application No. 102019130043.6, 8 pages.
Decision to Grant dated Sep. 7, 2020 for German patent application No. 102019130043.6, 6 pages.
Office Action dated Jul. 1, 2021 for German patent application No. 102019130635.3, 18 pages.
KIPO Notice of Allowance dated Sep. 5, 2021 for Korean patent application No. 9-5-2021-062620915, 2 pages.
Non-Final Office Action dated Mar. 28, 2022 for U.S. Appl. No. 16/858,536, filed Apr. 24, 2020, 49 pages.
Office Action dated Dec. 6, 2021 for German patent application No. 102019009189.2, 6 pages.
KIPO Notice of Allowance dated Mar. 23, 2022 for Korean patent application No. 9-5-2022-022045553, 4 pages.
KIPO Notice of Allowance dated Mar. 29, 2022 for Korean patent application No. 9-5-2022-023805806, 4 pages.
Non-Final Office Action dated Jan. 19, 2022 for U.S. Appl. No. 16/804,853, filed Feb. 28, 2020, 51 pages.
Decision to Grant dated Oct. 6, 2020 for German patent application No. 1020191130902.6, 6 pages.
KIPO Office Action dated Sep. 24, 2021 for Korean patent application No. 9-5-2021-074997218, 12 pages.
KIPO Office Action dated Sep. 24, 2021 for Korean patent application No. 9-5-2021-075180279, 5 pages.
Office Action dated Sep. 3, 2021 for German patent application No. 102019130639.6, 24 pages.
KIPO Office Action dated Aug. 6, 2021 for Korean patent application No. 9-5-2021-052621061, 18 pages.
Office Action dated Sep. 10, 2021 for German patent application No. 102019130923.9, 19 pages.
KIPO Notice of Allowance dated Sep. 29, 2021 for Korean patent application No. 9-5-2021-076720887, 2 pages.

(56) References Cited

OTHER PUBLICATIONS

Corrected Notice of Allowability dated Jun. 24, 2021 for U.S. Appl. No. 16/886,734, filed May 28, 2020, 7 pages.
Office Action dated Mar. 9, 2022 for German patent application No. 102019009206.6, 6 pages.
KIPO Notice of Allowance dated Apr. 27, 2022 for Korean patent application No. 9-5-2022-022045553, 9 pages.
Decision to Grant dated Apr. 20, 2022 for German patent application No. 102019009189.2, 7 pages.
Notice of Allowance dated May 16, 2022 for U.S. Appl. No. 16/804,853, filed Feb. 28, 2020, 55 pages.
Decision to Grant dated Jul. 1, 2022 for German patent application No. 102019009206.6, 7 pages.
Notice of Allowance dated Jun. 28, 2022 for U.S. Appl. No. 16/858,536, filed Apr. 24, 2020, 16 pages.
Non-Final Office Action dated Sep. 8, 2022 for U.S. Appl. No. 17/152,723, filed Jan. 19, 2021, 52 pages.
Notice of Allowance dated Oct. 6, 2022 for U.S. Appl. No. 16/874,587, filed May 14, 2020, 46 pages.
Decision to Grant dated Sep. 19, 2022 for German patent application No. 102019130923.9, 5 pages.
Decision to Grant dated Mar. 24, 2023 for German patent application No. 102019130639.6, 10 pages.
Notice of Allowance dated Jun. 14, 2023 for U.S. Appl. No. 17/152,723, filed Jan. 19, 2021, 16 pages.
JPO Office Action mailed Jul. 5, 2023 for Japanese patent application No. 2020-076751, 2 pages.
KIPO Office Action mailed Aug. 4, 2023 for Korean patent application No. 9-5-2023-077210761, 5 pages.
JPO Office Action mailed Jun. 12, 2023 for Japanese patent application No. 2020-111103, 6 pages.
Examiner MingJen Jen, USPTO Final Office Action mailed Feb. 7, 2023 for U.S. Appl. No. 17/152,723, filed Jan. 19, 2021, 28 pages.
Examiner MingJen Jen, USPTO Notice of Allowance mailed Jun. 14, 2023 for U.S. Appl. No. 17/152,723, filed Jan. 19, 2021, 16 pages.
JPO Office Action mailed Aug. 2, 2023 for Japanese patent application No. 2020-041743, 5 pages.
KIPO Office Action mailed Aug. 24, 2023 for Korean patent application No. 9-5-2023-077233946, 7 pages.
JPO Office Action mailed Aug. 2, 2023 for Japanese patent application No. 2020-025844, 3 pages.
KIPO Notice of Allowance mailed Sep. 22, 2023 for Korean patent application No. 9-5-2023087115306, 4 pages.
Examiner Yolanda Renee Cumbess, Notice of Allowance mailed Jul. 10, 2023 for U.S. Appl. No. 17/318,962, filed May 12, 2021, 15 pages.
JPO Office Action mailed Jun. 12, 2023 for Japanese patent application No. 2020-025844, 3 pages.
Examiner Thomas Randazzo, Non-Final Office Action mailed Oct. 19, 2023 for U.S. Appl. No. 17/949,092, filed Sep. 20, 2022, 22 pages.
Examiner Yolanda Renee Cumbess, Non-Final Office Action mailed Nov. 22, 2023 for U.S. Appl. No. 17/710,750, filed Mar. 31, 2022, 27 pages.
Examiner Thomas Randazzo, Non-Final Office Action mailed Dec. 19, 2023 for U.S. Appl. No. 17/953,275, filed Sep. 26, 2022, 23 pages.
German Patent Office Examiner Mayrhofer Decision to Grant mailed Oct. 17, 2023 for German patent application No. 102019130635.3, 1 page.
JPO Office Action mailed Jul. 3, 2023 for Japanese patent application No. 2020-072970, 6 pages.
JPO Decision to Grant mailed Nov. 29, 2023 for Japanese patent application No. 2020- 025844, 3 pages.
Examiner Yolanda Renee Cumbess, Non-Final Office Action mailed Nov. 2, 2023 for U.S. Appl. No. 17/318,962, filed May 12, 2021, 13 pages.
JPO Office Action mailed Dec. 1, 2023 for Japanese patent application No. 2020-072970, 6 pages.
JPO Notice of Reasons for Refusal mailed Dec. 15, 2023 for Application No. 2020- 016803, 6 pages.
JPO Decision of Rejection mailed Jan. 5, 2024 for Application No. 2020-111103, 4 pages.
KIPO Office Action mailed Feb. 15, 2024 for Korean patent application No. 10-2021-0150469, 4 pages.
JPO Decision to Grant mailed Jan. 30, 2024 for Japanese patent application No. 2020-076751, 2 pages.
KIPO Office Action mailed Jan. 19, 2024 for Korean patent application No. 10-2022-0088338, 6 pages.
JPO Office Action mailed Mar. 8, 2024 for Japanese patent application No. 2020-072970, 4 pages.
KIPO Office Action mailed Jan. 19, 2024 for Korean patent application No. 10-2022-0068061, 8 pages.
JPO Office Action mailed Jan. 5, 2024 for Japanese patent application No. 2020-111103, 4 pages.
JPO Decision to Grant mailed Dec. 25, 2023 for Japanese patent application No. 2020-041743, 5 pages.
KIPO Office Action mailed Feb. 19, 2024 for Korean patent application No. 10-2022-0059391, 3 pages.
Notice of Allowance mailed Jan. 31, 2024 for U.S. Appl. No. 17/949,092 filed Sep. 20, 2022, 14 pages.
Notice of Allowance mailed Apr. 10, 2024 for U.S. Appl. No. 18/466,745, filed Sep. 13, 2023, 10 pages.
Notice of Allowance mailed Apr. 9, 2024 for U.S. Appl. No. 17/953,275, filed Sep. 26, 2022, 18 pages.
Notice of Allowance mailed Apr. 22, 2024 for U.S. Appl. No. 17/710,750, filed Mar. 31, 2022, 19 pages.
JPO Office Action mailed Jun. 3, 2024 for Japanese patent application No. 2020-072970, 3 pages.
Non-Final Office Action mailed Jul. 15, 2024 for U.S. Appl. No. 17/953,275, filed Sep. 26, 2022, 17 pages.
KIPO Notice of Allowance mailed Jul. 18, 2024 for Korean patent application No. 10-2021-0150469, 4 pages.
Non-Final Office Action mailed May 10, 2024 for U.S. Appl. No. 18/175,436, filed Feb. 27, 2023, 24 pages.
KIPO Notice of Allowance mailed Jul. 25, 2024 for Korean patent application No. 10-2022-0059391, 4 pages.
Notice of Allowance mailed Jul. 30, 2024 for U.S. Appl. No. 18/466,745, filed Sep. 13, 2023, 18 pages.
KIPO Notice of Allowance mailed Aug. 22, 2024 for Korean patent application No. 10-2022-0068061, 5 pages.
KIPO Notice of Allowance mailed Aug. 27, 2024 for Korean patent application No. 10-2022-0088338, 4 pages.
Notice of Allowance mailed May 8, 2024 for U.S. Appl. No. 17/949,092, filed Sep. 20, 2022, 16 pages.
Notice of Allowance mailed Sep. 25, 2024 for U.S. Appl. No. 17/953,275, filed Sep. 26, 2022, 13 pages.
Final Office Action mailed Sep. 20, 2024 for U.S. Appl. No. 18/175,436, filed Feb. 27, 2023, 27 pages.

* cited by examiner

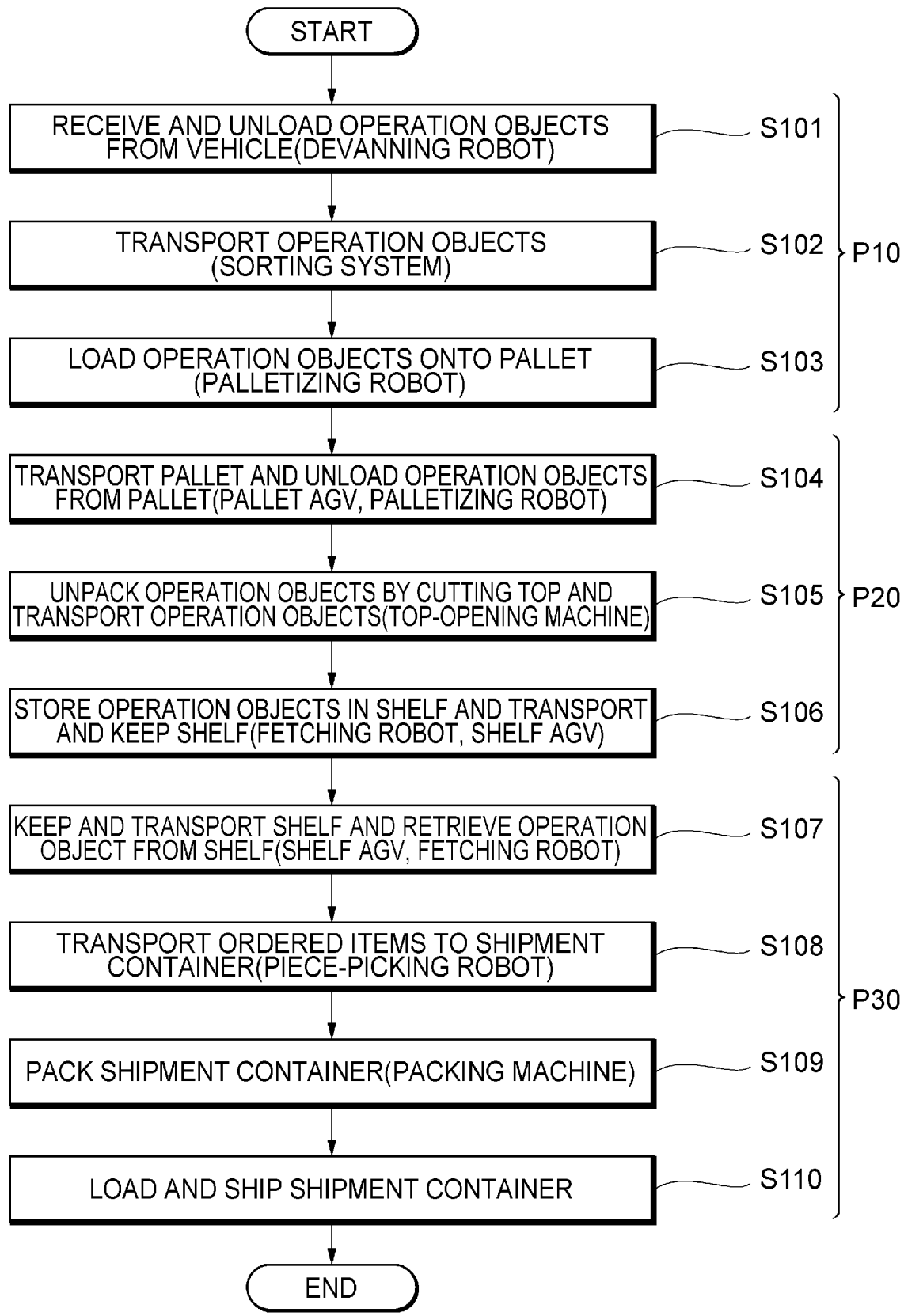

CONTROLLER AND CONTROL METHOD FOR ROBOTIC SYSTEM

CROSS-REFERENCE TO RELATED APPLICATION(S)

This application is a continuation of U.S. patent application Ser. No. 16/886,734, filed May 28, 2020, issued as U.S. Pat. No. 11,077,554, which claims priority and the benefit of Japanese Patent Application No. 2019208587 filed Nov. 19, 2019. The disclosure of each of these applications is incorporated by reference herein in its entirety. U.S. patent application Ser. No. 16/886,734 is a continuation-in-part of the following applications: U.S. patent application Ser. No. 16/428,870, filed May 31, 2019, issued as U.S. Pat. No. 10,647,528 on May 12, 2020, U.S. patent application Ser. No. 16/428,645, filed May 31, 2019, now issued as U.S. Pat. No. 10,696,493 on Jun. 30, 2020, U.S. patent application Ser. No. 16/428,843, filed May 31, 2019, now issued as U.S. Pat. No. 10,696,494 on Jun. 30, 2020, U.S. patent application Ser. No. 16/428,714, filed May 31, 2019, issued as U.S. Pat. No. 10,679,379 on Jun. 9, 2020, and U.S. patent application Ser. No. 16/428,809, filed May 31, 2019, issued as U.S. Pat. No. 10,618,172 on Apr. 14, 2020, all of which are incorporated by reference herein in their entireties.

TECHNICAL FIELD

The present disclosure generally relates to a robotic system, and more particularly to a controller (control apparatus) for a robotic system that manipulates objects (objects such as items) as well as to a robotic system control method, a logistics system (physical distribution system), a program, and a recording medium.

BACKGROUND

Many robots (e.g., machines configured to automatically/independently perform physical operation) currently enjoy wide use in many fields because of their ever-improving performance and falling costs. For example, robots can be used to perform various operations such as maneuvering and movements of objects in production, assemblage, packing, transfer, transportation, and the like. In performing operations, robots can repeat human motions, and thereby take over or reduce dangerous or repetitive human operations.

As a system (robotic system) using such robots, for example, Japanese Patent Laid-Open No. 2018-167950 proposes an automatic logistics system equipped with a transport container storage mechanism adapted to temporarily store a transport container for automation and laborsaving of processes from warehousing to shipping of items and an automatic item delivery mechanism adapted to automatically concentrate items from the transport container in a shipment container based on shipping information.

However, in spite of technological advancement, robots often lack sophistication needed to reproduce a human-involved operation in carrying out a larger and/or more complicated task. Therefore, many automation and functional expansion of robotic systems are still insufficient and still require human involvement. It is also difficult to sufficiently enhance handling property and storage efficiency for objects of different attributes for example. Consequently, there is still a need for technological improvements in order to manage various motions and/or interactions among robots and further promote automation and functional expansion of the robotic systems. Thus, one object of the present technology is to provide a robotic system controller and a robotic system control method that implement sophisticated cooperation among robotic units and enhance handling and storage efficiency for various types of objects.

SUMMARY

To solve the above problem, the present invention adopts the following configurations.

[1] A controller according to the present technology controls a robotic system including at least one operation robot adapted to manipulate an operation object to load the operation object on a pallet (palletize) and/or unload the operation object from the pallet (depalletize), where the operation robot manipulate the operation object using a robot arm, an end effector, and the like. Some examples of the operation robot can include a palletizing robot, a depalletizing robot, a piece-picking robot, a fetching robot, a devanning robot, and the like. The controller can include (1) a data deriving unit adapted to derive first data including information about an operation object and information about a pallet before loading of the operation object on the pallet and/or unloading of the operation object from the pallet; (2) a data storage unit adapted to store the first data; and (3) a robot control unit adapted to create or derive a control sequence for loading the operation object on the pallet and/or unloading the operation object from the pallet based on the first data. Based on the control sequence, the controller can instruct the operation robot to execute a task for loading of the operation object on the pallet and/or for unloading of the operation object from the pallet.

Here, the "operation object" may include an object manipulated by the operation robot provided in the robotic system. The operation object may include, for example, one or more items as well as a container such as a bin, a storage container, or a box, which contains the items or has the items placed thereon. The container may be either packed or unpacked. Also, part of (e.g., a top face) the container may be open. Also, in some embodiments, the "operation object" may be an object stored at a shelf, a pallet, a conveyor, and a temporary storage area. The "pallet" can include a loading table having a surface on which objects are placed in a known quantity for loading, transport, and storage. Examples of the pallet include a plane pallet, a box pallet, a post pallet, and the like. The pallet may or may not have an insertion port such as a folk. Furthermore, the "information about the object" and "information about the pallet" may include identification information for the operation object and identification information for the pallet, respectively. Also, the "control sequence" may include an operating sequence derived in advance for controlling or causing one or more units (e.g., robots) in the robotic system to execute individual tasks. Besides, the term "before" means that something is taking place at or prior to a given time point and the term "after" means that something is taking place at or subsequent to a given time point.

The "information about the operation object" includes at least positional information (e.g., pose, location, and/or orientation) of the operation object and information about "stock keeping unit (SKU)" of the operation object. The "stock keeping unit (SKU)" is a minimum management unit for performing order and stock management of the operation objects. For example, operation objects belonging to one type or category may be distinguished depending on one or more differences in attribute, such as packaging, content size, content color, and/or content quantity. For example, one type or category of operation objects may include a particular brand/design of clothes but have three colors and four sizes (e.g., S, M, L, and XL). Accordingly, one type/category of the operation objects may be further categorized into 12 SKUs. Note that SKU can be dynamically set by an operator. SKU may be set without distinguishing the objects by the color or size. In general, however, it is considered that operation objects may be distinguished by the SKU according to example factors described below (the Distribution Systems Research Institute, GTIN Guidelines, Revised Edition of GTIN Allocation Guidelines Version 2018.12, p. 10).

There is any element that must be determined to be a different item in sales;

It is desirable to appeal the differences in the goods to the consumers;

It is desirable to analyze the sales of the goods individually. (Examples of different attributes within a type/category of goods)

Different size (e.g., large, medium, small);

Difference in the amount of packaged content (e.g., weight, quantity, the number of pieces, etc.);

Different packaging form (e.g., bag, can, bottle, etc.);

Different appearance (e.g., color);

Different flavor;

Different scent;

Different sales units (e.g., groupings of 3 pieces, 5 pieces, 15 pieces, etc.); and/or Different packaging combination of goods (e.g., gift baskets).

With such example configuration, information about the operation object and information about the pallet may be obtained before loading the operation object on the pallet and/or before unloading the operation object from the pallet. Accordingly, a task may be executed based on creating the control sequence according to the first data including such information. Since the control sequence may be derived before execution, the loading/unloading tasks may be executed efficiently and smoothly without breaks resulting from reactive computations of the sequence (e.g., for the next action/portion) during execution of the overall task.

[2] In the above configuration, the data deriving unit may derive second data including the information about the operation object and the information about the pallet after the operation object is loaded on the pallet and/or the operation object is unloaded from the pallet. The data storage unit may store the second data.

With this configuration, information about the operation object and information about the pallet can be obtained after the operation object is loaded on the pallet and/or after the operation object is unloaded from the pallet. This makes it possible to track a state or situation of the pallet reliably after the operation object is loaded and/or after the operation object is unloaded.

[3] In the above configuration, the robot control unit may be adopted to create or derive the control sequence based on the first data and/or the second data such that a plurality of types of operation objects (e.g., different SKUs) are loaded on the pallet.

With this configuration, SKUs of (1) the operation objects scheduled to be loaded on the pallet and/or (2) the operation objects having been loaded on the pallet can be identified from the first data and the second data. Therefore, even in the case where different operation objects and/or different SKUs are loaded in the same pallet (such as for mixed loading), it is possible to monitor and trace the loaded state of the operation objects. This makes it possible to increase the load factor of the pallet, thereby improving the utilization efficiency of the pallet. Moreover, since filling information/availability information of the pallet can be determined, as the next stage, selection of a pallet for loading the operation object on the pallet and/or unloading the operation object from the pallet can be performed efficiently. This also makes it possible to prevent the pallet from being fragmented with unused spaces (defragmentation), and makes it easier to collectively manage positional information about the operation object and the pallet.

[4] In the above configuration, the robot control unit may be adapted to create or derive the control sequence based on the first data and the second data such that the operation objects of the same or similar stock keeping units (SKUs) are placed in a concentrated manner on the pallet. Here, "similar" means that among the attributes (color, size, and the like as described above) defining the SKUs, a predetermined number or more of the attributes are common. The present configuration also allows placement and tracking of operation objects of the same or similar SKUs on the same pallet (for non-mixed loading) and/or operation objects of different SKUs are loaded on the same pallet (for mixed loading). In the case of mixed loading, operation objects of the same or similar SKUs on the pallet can be loaded in a concentrated manner (e.g., stacked in the vertical direction, placed adjacent to each other or the like).

With this configuration, the SKUs of the operation objects targeted to be loaded on the pallet and the operation objects previously loaded on the pallet can be identified and processed (e.g., simulated for placement/motion planning) using the first data and the second data. This makes it easy to place the operation objects of the same or similar SKUs in a concentrated manner. Consequently, regardless of single-type loading or mixed loading, the load factor can be increased, and the utilization efficiency of the pallet can be improved. Moreover, since the operation objects having the same or similar SKUs are placed in a concentrated manner, as the next stage, selection of a pallet for loading the operation object on the pallet and/or unloading the operation object from the pallet can be performed efficiently. In other words, creating or deriving the control sequence may include determining or selecting, based on the first data and the second data, one of the pallets on which the operation object is to be loaded and/or uploaded.

[5] In the above configuration, the robot control unit may compute, based on the second data, an index indicating the handling property for unloading the operation objects from the pallet, and based on the index, create or derive the control sequence including identification or determination of the operation object and/or the pallet loaded with the operation object. Here, "handling property" represents the degree of difficulty associated with manipulation of the operation object by the robot. The handling property may quantitatively represent, as an example, the degree of difficulty when the operation robot grasps the operation object loaded on the pallet, the degree of difficulty when the operation robot moves the grasped operation object (complication of the route, or the like), and the like. Also, the "index" may be digitized quantitatively and, for example, may represent a qualitative ranking/evaluation.

With this configuration, when there are plural candidates for operation objects to be unloaded, it is possible to select a pallet loaded with operation objects that may be easier to manipulate using the operation robot based on the index indicating the handling property. This increases the likelihood of the robot accurately grasp and manipulate the targeted object, resulting in improvement of operating efficiency and operating accuracy (success rate).

[6] In the above configuration, the data storage unit may store positional information (layout information) about a plurality of the operation objects on the pallet as two-dimensional information and/or three-dimensional information for each operation object or for each pallet.

With this configuration, positions of the operation objects placed on the pallet can be identified for each operation object or for each layer. Also, the layout of the plural operation objects stacked on the pallet can be managed collectively as one-dimensional information or three-dimensional information. Thus, for example, if one operation object is specified, the other operation objects/SKUs loaded on the same pallet can be specified all at once. This makes it possible to improve operating/processing efficiency, for example, by reducing resources (e.g., time) needed for inventory control and stocktaking.

[7] In the above configuration, the robotic system may further include a sensor adapted to image the operation object or the pallet loaded with the operation object, and the robot control unit may create or derive the control sequence for loading the operation object on the pallet so as to allow the sensor to measure identification information (e.g., an identification code or identification tag representing the identification information) about the operation object.

With this configuration, even if an operation object is loaded on the pallet, the identification information about the operation object can be checked via the sensor. For example, if the identification information about the operation object is attached at least to a side surface, the operation object may be placed/stacked on the pallet with the identification information exposed/visible. The identification information attached to the operation object can be easily recognized by being imaged by a sensor such as a camera. Thus, even if an object is on the pallet, the object can be identified and specified easily. In so doing, when positional information about the plural operation objects on the pallet are stored in advance (e.g., as two-dimensional information or three-dimensional information as with [6] above), all operation objects loaded on the pallet can be identified and located more easily and simply all at once based on identifying and locating one operation object. This makes it possible to further improve operating efficiency in inventory control and stocktaking.

[8] In the above configuration, the robot control unit may indicate that loading of the operation object on the pallet and/or unloading of the operation object from the pallet are/is/will be complete, before the task is actually complete. In some embodiments, the robot control unit may set a status representing that loading/unloading of the operation object is completed, before actual implementation of the task is finished.

With this configuration, a completion status of a preceding stage may be set before the actual/real-world completion of such stage. Thus, a task for the next stage can be started smoothly on a timely basis, such as by using the completion status of the preceding stage as a trigger for parallel execution or preparation, thereby enabling sophisticated cooperation among units and reducing work delays.

[9] In the above configuration, the data deriving unit may derive actually measured values or estimated values for the information about the operation object and/or the pallet. Consequently, the position of the operation object on/outside the pallet, the position of the pallet, and the position of the identification information attached to the operation object can be derived by actually measuring aspects of the corresponding structures with a sensor (e.g., a camera) and/or by estimating via predetermined data (using, e.g., master data without actual measurement).

[10] A logistics system according to the present technology includes the controller according to any one of the above configurations; and a robotic system including the operation robot.

[11] In the above configuration, the controller may identify the robotic system and a region related to the robotic system and calculate tasks (including a unit task and a task made up of a combination of a plurality of unit tasks) based on the control sequence. The tasks may include a task related to transportation of the pallet and/or manipulation/transfer of the operation object by the robotic system. The robotic system may execute a plurality of tasks across adjacent and/or overlapping regions.

[12] A program according to the present technology causes a computer to function as the controller of any one of the above configurations.

[13] A recording medium according to the present technology is a computer-readable non-transitory recording medium on which the above instructions/configurations are stored.

[14] A control method according to the present technology may include a control method for a robotic system that includes an operation robot adapted to manipulate an operation object to load the operation object on a pallet and/or unload the operation object from the pallet. The control method may be performed via a controller having a data deriving unit, a data storage unit, and a robot control unit. With this method, (1) the data deriving unit may derive first data including information about the operation object and information about the pallet before loading of the operation object on the pallet and/or unloading of the operation object from the pallet; (2) the data storage unit may store the first data; and (3) the robot control unit may create or derive a control sequence for loading the operation object on the pallet and/or unloading the operation object from the pallet based on the first data before the loading of the operation object on the pallet and/or unloading of the handing object from the pallet, and based on the control sequence, may instruct or control the operation robot to execute a task of loading the operation object on the pallet and/or unloading the operation object from the pallet.

BRIEF DESCRIPTION OF THE DRAWINGS

FIG. 1 is a schematic flowchart showing an example work sequence for a robotic system according to one embodiment of the present technology.

DETAILED DESCRIPTION

Figure 2A:
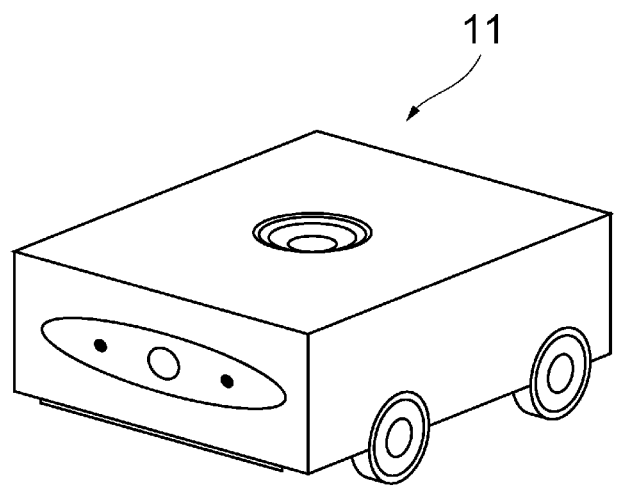
FIGS. 2A and 2B are perspective views illustrating example transport robots according to one or more embodiments of the present technology.

The present technology provides a robotic system in which multiple units (e.g., various robots, various devices, a controller provided integrally therewith or separately therefrom) are integrated in a sophisticated manner, a controller for the robotic system, a logistics system equipped therewith, a method therefor, and the like. That is, a robotic system according to an embodiment of the present technology is an integrated system capable of autonomously executing, for example, one or more tasks.

Here, "tasks" can include, for example, a robot and the like (1) accessing operation objects, (2) moving/transferring the operation objects from one place to another and storing, (3) keeping, retrieving, and/or organizing the operation objects, (4) classifying the operation objects into plural groups, and/or (5) imaging, observing, and managing the operation objects.

Also, "tasks" can include, combinations of plural tasks executed during warehousing of operation objects (goods receipt, transportation, loading (palletizing), unloading (depalletizing), housing, etc.), replenishment with operation objects (unpacking, filling, replenishment, etc.), and/or shipping of operation objects (retrieval, pickup, packing, loading, palletizing, etc.) in a logistics system. Furthermore, "tasks" can include, for example, gripping or lifting operation objects at a specified position, moving operation objects on a specified path, and releasing, putting down, or placing operation objects at a specified position in order to rearrange, regrip, or replace the operation objects.

Furthermore, the robotic system and/or the controller according to the present technology can access operation objects, for example, via plural units such as a robot. Consequently, the robotic system can support automation of operations in a warehousing process, replenishment process, shipping process, and the like of the operation objects. Furthermore, the robotic system and/or the controller according to the present technology can classify (group) operation objects as appropriate (e.g., based on the SKU differences), move or place the operation objects to/at desired positions or specified positions, access the operation objects, relocate or reclassify the operation objects in the place or in other places, and/or rearrange or replace the operation objects according to characteristics of the operation objects. In this case, the robotic system and/or the controller can read one or more pieces of identification information (e.g., a bar code or Quick Response (QR) code (registered trademark)) attached to one or more specific positions or surfaces of the operation objects. The identification information can be checked against master data as required, thereby identifying and/or pinpointing the operation objects. Based on the identification information, information associated with the operation objects may be derived.

Furthermore, the robotic system according to the present technology can be equipped with a sensor such as an imaging sensor to identify positions and states (e.g., attitudes including orientations) of operation objects and/or a surrounding environment of the operation objects. The imaging sensor can derive images of working positions (e.g., positions of the operation objects including a pick-up position, a drop position, and/or one or more positions along a path) for the tasks executed by individual units of the robotic system. Similarly, the imaging sensor can derive images of the operation objects at the working positions. Also, the robotic system (via, e.g., the controller) can process images of the operation objects in a predetermined order (e.g., from top to bottom, from a lateral edge, or from an inner side of the operation object). In so doing, states and situations of the images of the operation objects can be determined as appropriate by identifying and classifying outer shapes and environments of the operation objects for example, based on colors of adjacent pixels, brightness, and/or changes in those values on the images of the operation objects.

The robotic system can derive (via, e.g., the controller) and execute a control sequence for executing a task of accessing and manipulating operation objects, a task of transporting, moving, placing, storing, and otherwise manipulating the operation objects, and other tasks. The control sequence can include a combination of commands and/or settings for driving operative mechanisms (e.g., actuators) of the respective units. The robotic system can create or derive a control sequence for executing various tasks, for example, by machine learning such as motion planning or deep learning, or by another method.

Conventional robotic systems used in a typical logistics system, such as for warehousing, replenishment, or shipping of operation objects, are often unable to perform sophisticated interaction among plural units. As such, operator support is often required for successful transitions across different tasks. Also, conventional robotic systems often require the operator to classify ordered goods or place them in order. Furthermore, with the conventional robotic system, changing/replacing the robotic units and/or corresponding operating procedures is often difficult. In particular, when the units require operator intervention and support, it is extremely difficult to autonomously or automatically change a control sequence. Moreover, conventionally, in the case of loading operation objects on a pallet or the like, it is difficult to automate loading of different SKUs in a mixed manner on the same pallet. As such, mixed loading conventionally requires operator intervention. This hinders full-automation of a logistics system.

Also, the conventional robotic system executes a task of gripping an operation object at one position, moving to another position in this state, and releasing the operation object. However, conventional systems often lack the capacity to account for storage efficiency for objects and operating efficiency of each unit. Accordingly, conventional systems often require operator intervention and support (adjustment, redo, supplementation, system stop, etc.) to achieve the desired storage/operating efficiency.

In contrast, the robotic systems/controllers according to various aspects of the present technology (described below by example) can adjust and control interaction among separate units (e.g., the operation robot and transport robot) in executing tasks and promote cooperation among different units. Consequently, the operator intervention and support is reduced/eliminated, and the storage efficiency for operation objects, operating efficiency, and economy can be improved. Furthermore, by acquiring and managing information about the operation objects and the pallet at appropriate timing for palletizing and depalletizing of the operation objects, it is possible automate loading of the operation objects having different SKUs on the same pallet in a mixed manner.

Also, the robotic system/controller can reliably identify an operating range, a motion path, positions and states of operation objects, or a combination thereof concerning each unit, and execute tasks smoothly across different units. In so doing, the robotic system/controller can further increase efficiency of space usage based on identifying and processing shape information, identification information, positional information, and other similar information about the operation objects. The robotic system/controller can create or derive, and execute one or more algorithms configured to place tasks of different units in order. The controller can further establish one or more protocols for controlling interaction among separate units and derive a suitable control sequence that can implement sophisticated cooperative motions among various units based on information about the states of operation objects.

Embodiments according to an example of the present technology will be described below with reference to the accompanying drawings. However, the embodiments described below are merely illustrative, and various modifications and technical applications not mentioned hereinafter are not intended to be excluded. That is, the example of the present technology can be implemented in various modified forms without departing from the spirit and scope of the present technology. Also, in the following drawings, the drawings are schematic and do not necessarily represent actual sizes, ratios or the like. Furthermore, the drawings may not be shown in their true size relations. Also, the embodiments described below are part of the embodiments of the present technology rather than all the embodiments of the present technology. Furthermore, any other embodiment obtained by those skilled in the art based on embodiments of the present technology without the need for creative activities is included in the scope of protection of the present technology.

Also, in each embodiment, technique introduced herein can be carried out without particular details of the technique. Furthermore, detailed description of well-known functions such as specific functions or routines is omitted to avoid making the present technology unnecessarily difficult to understand. Besides, detailed description of well-known structures or processes often associated with robotic systems and subsystems may also be omitted for the sake of clarification. Reference to "an embodiment," "one embodiment," or the like herein means that a specific feature, structure, material, or characteristic is included in at least one embodiment of the present technology. Therefore, the mention of such a phrase herein does not necessarily refers to the same embodiment. On the other hand, such references are not always mutually exclusive. Furthermore, a specific feature, structure, material, and characteristic can be combined in any appropriate manner in one or more embodiment. It should be understood that various illustrated embodiments are presented only in an explanatory manner and are not necessarily shown in their true scales.

Also, many embodiments or aspects of the present technology include processes, steps, routines, blocks, and the like executed by a programmable computer or controller (controller) and take the form of commands executable by the computer or controller. It should be understood by those skilled in the art that the disclosed technique can be implemented by a system of computers or controller other than those shown in the embodiments. The technique described herein can be carried out in a special-purpose computer or data processor programmed, configured, or built to execute one or more computer-executable commands described below.

Thus, the terms "computer" and "controller" generally used herein include any data processor as well as an Internet-enabled apparatus and a hand-held device (including palmtop computers, wearable computers, cellular or mobile phones, multi-processor systems, processor-based or programmable household electric appliances, network computers, and minicomputers). Information handled by the computer and controller can be provided to any appropriate display media including, for example, a liquid crystal display (LCD).

Commands issued to execute tasks executable by the computer or the controller can be stored in hardware, firmware, or an appropriate computer-readable non-transitory recording medium including a combination of hardware and firmware. Also, each command can be included, for example, in any appropriate memory device including a flash drive and/or other appropriate medium.

"Coupled," "connected," and other similar terms may be used to describe structural relationships among components. However, it is not intended that these terms are interchangeable. Specifically, in specific embodiments, the term "connected" can be used to indicate that two or more elements are in direct contact with one another. Unless otherwise understood clearly from the context, the term "coupled" can be used to indicate that two or more elements are in contact with one another either directly or indirectly (by involving intervening elements among them), indicate that two or more elements collaborate or interact one another (such as when the elements are in a cause-and-effect relationship as in the case of signal transmission/reception or a function call), or indicate both states.

Application Example

FIG. 1 is a schematic flowchart showing an example work sequence of a logistics system including a robotic system according to one embodiment of the present technology. In some embodiments, the work sequence may include a warehousing process P10 of receiving operation objects (e.g., containers such as carton boxes containing items, according to the present embodiment) into a distribution center or the like. The work sequence may also include a replenishment process P20 of replenishing a storage space (e.g., a shelf or the like) with operation objects, which may be placed, for example, on a pallet or the like. The work sequence may further include a shipping process P30 of picking up and shipping ordered items from the stored/replenished operation objects.

At block S101, operation objects carried in by a vehicle or the like may be received. In receiving, the objects may be unloaded using, for example, a devanning robot. At block S102, using, for example, a sorting system, the operation objects may be transported on a conveyor or the like to a waiting position of reloading pallets. At block S103, the operation objects that have been transported may be loaded, for example, onto an appropriate pallet by a palletizing robot.

At block S104, the pallet with the operation objects placed thereon may be transported to a predetermined position. The pallet may be transported using, for example, a pallet automated guided vehicle (AGV) configured to move pallets by carrying or lifting them. The predetermined position may be a location where operation objects are unloaded from the pallet, for example, by a depalletizing robot. At block S105, the operation objects may be transported by a conveyor or the like to a waiting position of storage shelves. During transport, the operation objects may be exposed/unpacked by cutting or opening the top of the operation objects, using, for example, a top-opening machine. At block S106, the operation objects may be stored, such as in an appropriate position of the shelf (via, e.g., a fetching robot) and/or transported to a shelf storage location (via, e.g., a shelf AGV, and kept in an appropriate state.

In some embodiments, the shipping process P30 may correspond to an order for items). At block S107, a shelf having operation objects thereon with the ordered items may be transported to a retrieval position using, for example, a shelf AGV. At the retrieval position, a desired operation object (e.g., a box or a container) may be retrieved from the shelf by, for example, a fetching robot. At block S108, using, for example, a piece-picking robot, the ordered items may be picked from the operation object, and transported to a shipment container or the like. At block S109, the shipment container may be packed using, for example, a packing machine. At block S110, the packed shipment container may be loaded into, for example, an appropriate cart or vehicle and shipped.

In this way, the robotic system can include or interact with operation robots (e.g., transporting/sorting units such as a devanning robot, palletizing robot, depalletizing robot, fetching robot, piece-picking robot, packing machine, and the like) configured to move operation objects between different locations. Also, the robotic system according to one embodiment can include a sorting system, pallet AGV, and shelf AGV as transport robots serving as transport units.

Figure 2B:
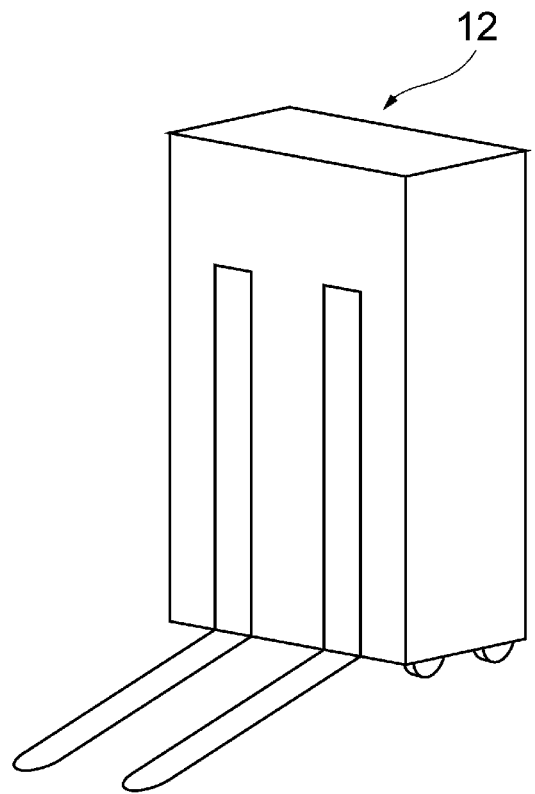

Here, FIGS. 2A and 2B are perspective views illustrating example transport robots 11 and 12 according to one or more embodiments. The transport robots 11 and 12 can include a mobile/wheeled robot such as a shelf AGV configured to transport pallets between predetermined positions. For example, the transport robots 11 and 12 have such outside dimensions as to allow the transport robots 11 and 12 to move under pallets and/or between pallets. Also, the transport robots 11 and 12 can include a lifting mechanism (e.g., a folk) configured to lift pallets from the ground (e.g., a transport path surface).

The transport robots 11 and 12 can be navigated using various mechanisms. For example, the transport robots 11 and 12 can travel by themselves tracing a predetermined path provided (e.g., a floor marking, such as painting or tape). The transport robots 11 and 12 can travel based on instructions from a controller of a robotic system according to an embodiment. Also, the transport robots 11 and 12 can calculate current positions via a mapping/positioning mechanism (e.g., a dead reckoning system, a system based on laser, and/or a system based on a radio communications signal), and move along a specified path and route based on the current positions.

Note that a robotic system according to an embodiment can transmit (e.g., via a controller as a stand-alone device or part of another unit) a target position of a pallet to be transported, a holding position of the pallet, identification information about the pallet, a path, a motion plan, or a combination thereof to the transport robots 11 and 12. Based on communication instruction information, the transport robots 11 and 12 can execute a task of, for example, moving to the holding position of the pallet to be transported, lifting the pallet, transporting the pallet to a specified position, and/or placing the pallet at the specified position. Furthermore, the transport robots 11 and 12 can execute or complete the task by returning the pallet to the original holding position or a different storage location.

Figure 3:
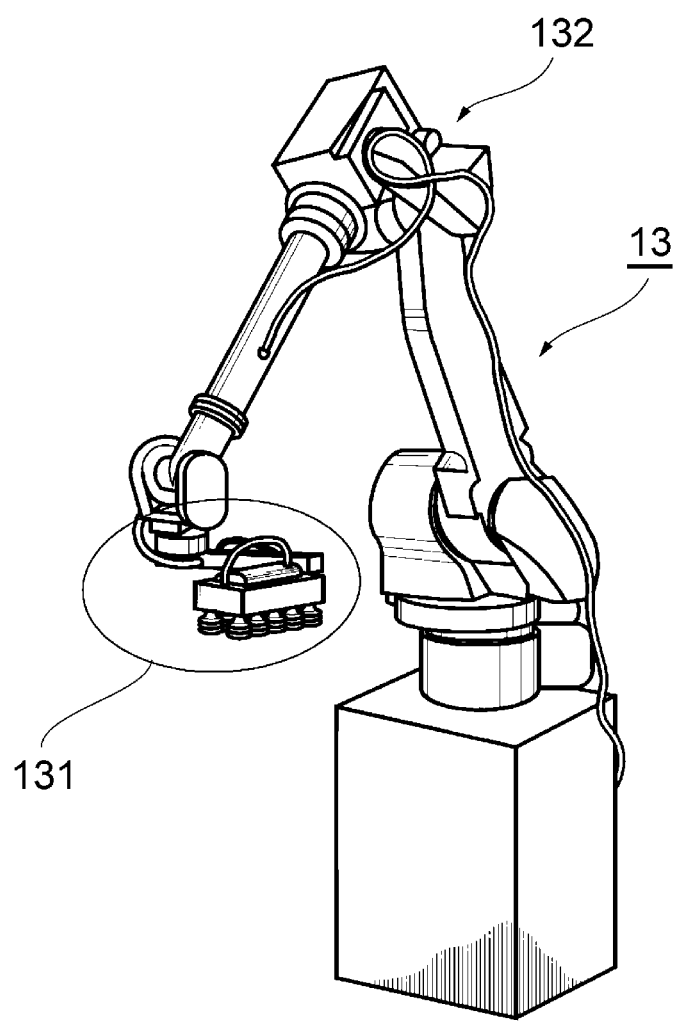
FIG. 3 is a perspective view illustrating an example operation robot according to one or more embodiments of the present technology.
Figure 4A:
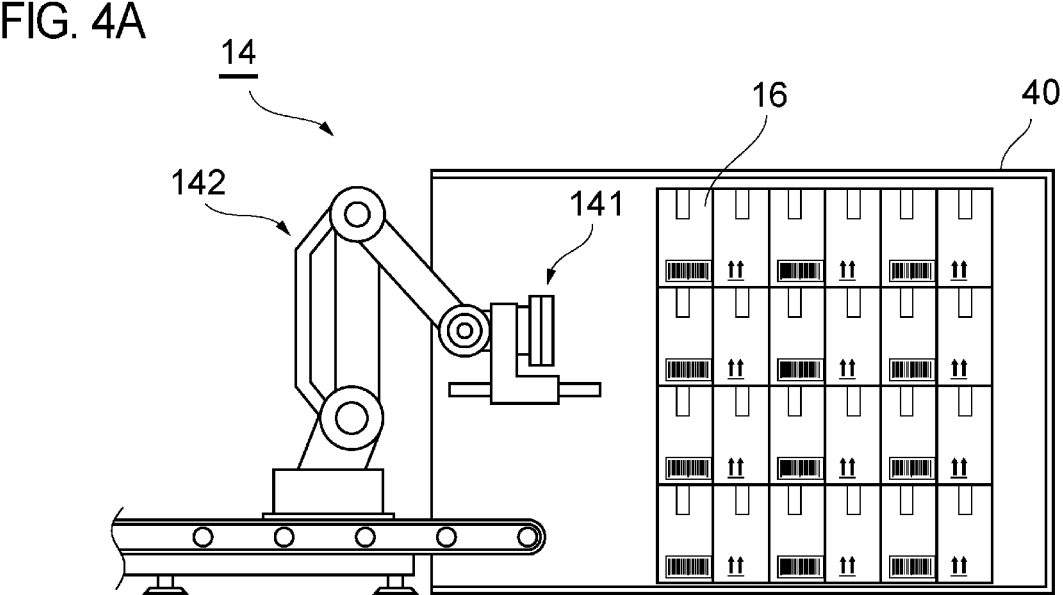
FIGS. 4A and 4B are perspective views illustrating an example operation robot according to one or more embodiments of the present technology.
Figure 4B:
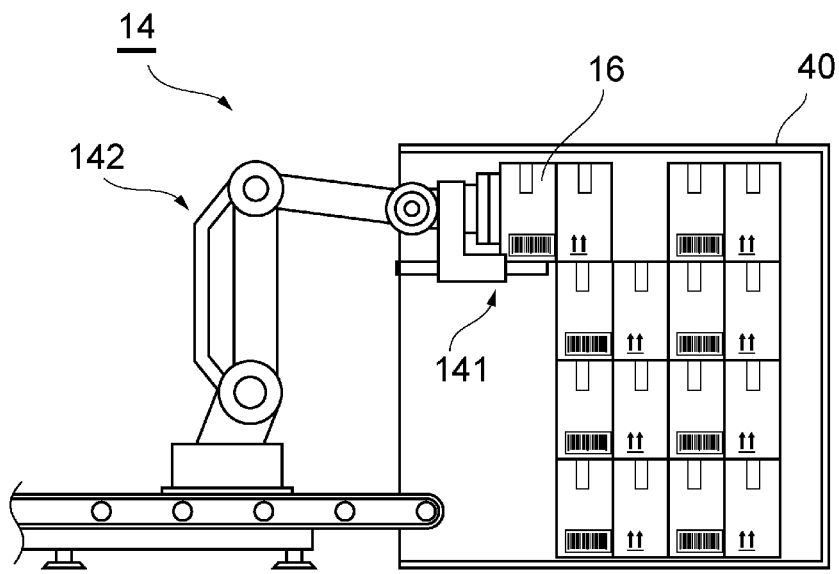

FIGS. 3, 4A, and 4B are perspective views illustrating example operation robots 13 and 14 according to one or more embodiments of the present technology. The operation robots 13 and 14 can include, for example, a robot configured to transfer operation objects 16 (see FIG. 4) between predetermined positions. For example, the operation robots 13 and 14 have structural members including end effectors 131 and 141 and robot arms 132 and 142 equipped with the end effectors 131 and 141 at the tips. The end effectors 131 and 141 may be grippers capable of gripping operation objects by decompression suction or vacuum suction. Also, the end effectors 131 and 141 may be a hand type gripper for picking. This allows the operation robots 13 and 14 to grip the operation objects from above and/or along a lateral direction. Also, the operation robots 13 and 14 may fixed to a predetermined location or may be configured for locomotion. In addition, the end effector 141 of the operation robot 14 may be equipped with a plate guide or the like configured to support (hold) the operation object 16 from below (e.g., devanning gripper) and suitably functions as a devanning robot or a fetching robot.

The operation robots 13 and 14 can be driven, for example, on instructions from a controller of a robotic system according to an embodiment. Also, the operation robots 13 and 14 can calculate current positions of operation objects and manipulate the operation objects along specified paths and routes based on the current positions. The robotic system can transmit (e.g., via a stand-alone controller or a device that is part of another unit) target positions and pickup positions of the operation objects, identification information about the operation objects, paths, motion plans, or a combination thereof to the operation robots 13 and 14. Based on communication instruction information, each of the operation robots 13 and 14 can execute a task such as moving the end effectors 131 and 141 to a grip position of an operation object, gripping and lifting the operation object, transporting the operation object to a specified position, and/or placing the operation object at the specified position.

Configuration Example

Figure 5:
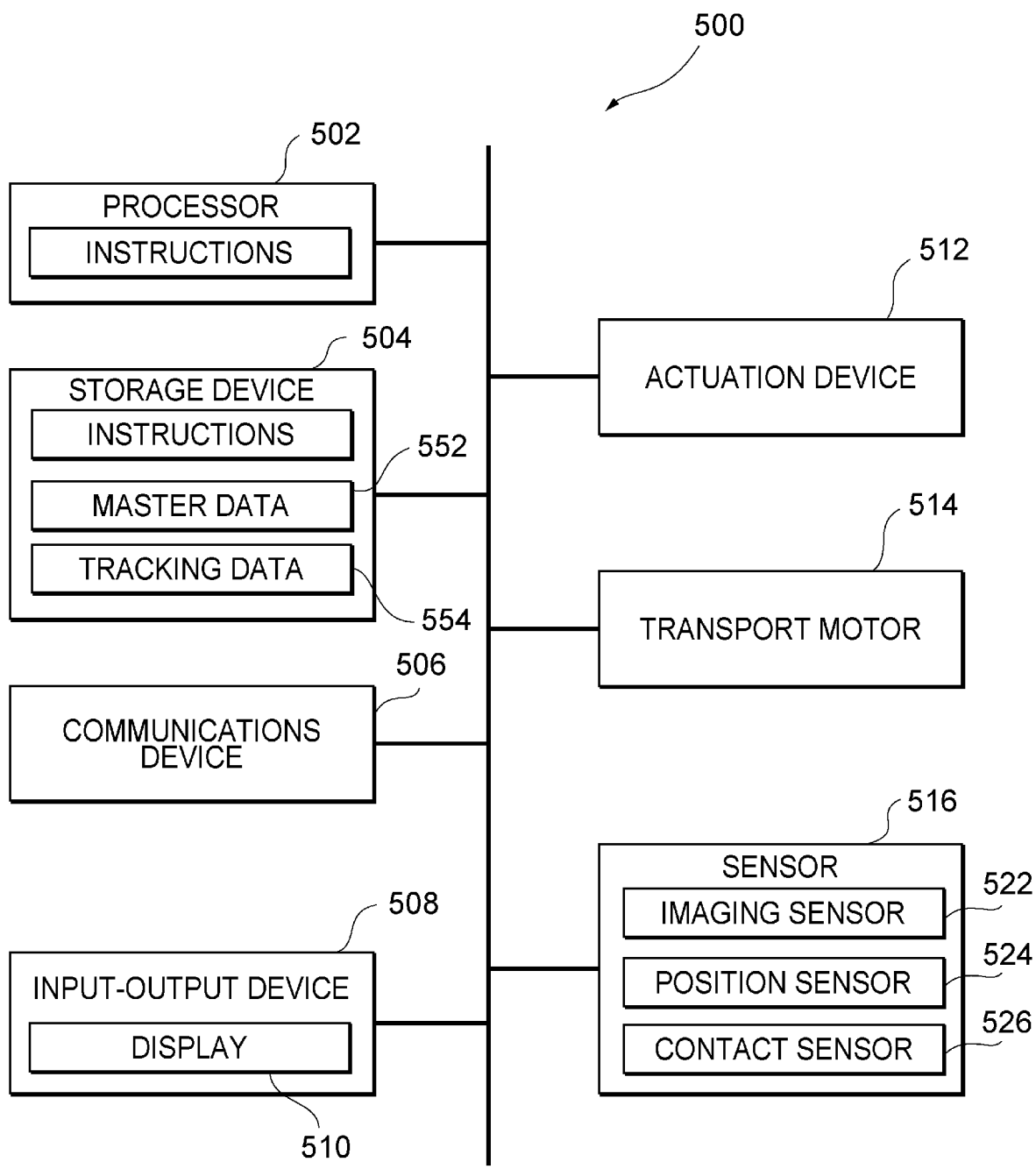
FIG. 5 is a block diagram showing an example of a hardware configuration and functional configuration of a robotic system according to one embodiment of the present technology.

FIG. 5 is a block diagram showing an example of a hardware configuration and functional configuration of a robotic system according to one embodiment of the present technology. For example, a robotic system 500 can be equipped with electronic/electrical equipment such as a processor 502, storage device 504, communications device 506, input-output device 508, actuation device 512, transport motor 514, sensor 516 or combination thereof. The robotic system 500 can be equipped with more than one of these elements and devices.

Also, these circuits and/or devices can be coupled together via wired connections and/or wireless connections. For example, the robotic system 500 can include buses such as a system bus, a Peripheral Component Interconnect (PCI) bus or a PCI Express bus, a HyperTransport or Industry Standard Architecture (ISA) bus, Small Computer Systems Interface (SCSI) bus, Universal Serial Bus (USB), an IIC (I2C) bus, and an IEEE 1394 (Institute of Electrical and Electronic Engineers) bus (also referred to as a "Firewire" bus).

Also, to provide wired connections among devices, the robotic system 500 can include, for example, a bridge, an adapter, a controller, and/or another signal-related device. Wireless connections may be based, for example, on a cellular communications protocol (e.g., 3G, 4G, LTE, or 5G), a wireless local area network (LAN) protocol (e.g., wireless fidelity (WIFI)), a peer-to-peer or device-to-device communications protocol (e.g., Bluetooth (registered trademark) or Near-Field Communications (NFC)), an Internet of Things (IoT) protocol (e.g., NB-IoT or LTE-M), and/or another wireless communications protocol.

The processor 502 can include a data processor (e.g., central processing unit (CPU), special-purpose computer, and/or on-board server) configured to execute commands (e.g., software instructions) stored in the storage device 504 (e.g., a computer memory). The processor 502 can execute program instructions so as to control, or interact with, other devices, thereby making the robotic system 500 perform various motions, operations, and/or manipulations, in a task.

The storage device 504 can include a computer-readable non-transitory recording medium with program instructions (e.g., software) stored thereon. Examples of the storage device 504 include a volatile memory (e.g., cash and/or random access memory (RAM)), a non-volatile memory (e.g., flash memory and/or magnetic disk drive), a portable memory drive, and a cloud storage device.

In some embodiments, the storage device 504 further stores processing results, predetermined data, a predetermined threshold, a predetermined parameter, and allows access to them as appropriate. For example, the storage device 504 can store master data 552 including information associated with operation objects that can be processed and/or manipulated by the robotic system 500.

The master data 552 can include dimensions, shapes (e.g., computer-generated templates of possible states and computer-generated models used to recognize the operation objects in different states), colors, images, identification information (e.g., bar codes, Quick Response (QR) codes (registered trademark), and logos as well as positions where the codes and the like are expected to be provided), expected weights, or a combination thereof regarding the operation objects. Also, the master data 552 can include information associated with maneuvering of the objects, such as respective center-of-mass (center-of-gravity) positions of the operation objects, expected measurement values (e.g., various measurement of force, torque, pressure, and/or a contact reference value) of sensors in response to one or more motions/movements, or a combination thereof.

Also, for example, the storage device 504 can store object tracking data 554 that is produced when the operation objects are tracked and/or manipulated by the robotic system 500. The object tracking data 554 can include a log of scanned or manipulated operation objects. Also, the object tracking data 554 can include image data (e.g., photos, point clouds, and live videos that are provided) of operation objects at one or more positions (e.g., a specified pickup position or drop position, and/or, a position on a conveyor belt) and/or positions/states (orientations, etc.) of the operation objects at one or more positions.

The communications device 506 can include a circuit configured to communicate with an external device or remote device via a network. For example, the communications device 506 can include a receiver, a transmitter, a modulator/demodulator (modem), a signal detector, a signal encoder/decoder, a connector port, and/or a network card. The communications device 506 can be configured to receive, transmit, and/or process signals according to one or more communications protocols (e.g., the Internet Protocol (IP) and/or a wireless communications protocol). Using the communications device 506, the robotic system 500 can exchange information among the units of the robotic system 500 and/or with systems/apparatus external to the robotic system 500 for example, for the purposes of data collection, analysis, reporting, trouble shooting, and the like.

The input-output device 508 can include a user interface device configured to exchange information with the operator and/or receive information from the operator. For example, to exchange information with the operator, the input-output device 508 can include a display 510 and/or other output device such as a speaker, a tactile circuit, and/or a tactile feedback device. Also, the input-output device 508 can include control and receiving devices such as a keyboard, a mouse, a touchscreen, a microphone, a user interface (UI) sensor (e.g., a camera used to receive motion commands), and/or a wearable input device. Using the input-output device 508, the robotic system 500 can interact with the operator when performing tasks, motions, operations, manipulations, or a combination thereof.

A robotic unit associated with the robotic system 500 can include a structural member that is connected by a joint for motions (e.g., rotation and/or translation) and an end effector. The end effector can be configured, for example, to pick up, grip, spin, and/or weld with respect to a target object. An example of the structural member can include a robot arm and the like configured to maneuver the end effector (e.g., the robot arm 132 and 142 of FIGS. 3, 4A, and 4B). Also, at or around a joint, the robotic unit can include an actuation device 512 (e.g., a motor, an actuator, a wire, an artificial muscle, and/or an electroactive polymer) configured to drive or maneuver (e.g., displace and/or orient) the structural member. The robotic unit may also include the transport motor 514 configured to transport the unit from one position to another.

The robotic system 500 can include a sensor 516 to obtain information used in driving or maneuvering the structural member and/or performing transport work of various units. The sensor 516 can include various devices configured to detect or measure one or more physical properties (e.g., states, conditions, positions, and the like of one or more joints or structural members) of the robotic system 500 and/or characteristics of a surrounding environment. Some examples of the sensor 516 can include an imaging sensor 522, position sensor 524, and contact sensor 526 as well as an accelerometer, a gyroscope, a force sensor, a strain gage, and/or a torque sensor.

The imaging sensors 522 can include, for example, a visible camera and/or infrared camera, a two-dimensional imaging camera and/or three-dimensional imaging camera (2D vision and/or 3D vision), and a ranging device such as a lidar or radar configured to detect the surrounding environment. In applying automated inspection, robot guidance, or another robot, the imaging sensor 522 can generate data such as digital images and/or distance measurements (e.g., point clouds) that may be used to control various units and the controller.

To manipulate each operation object, the robotic system 500 can identify positions of various elements by analyzing images of specified regions (e.g., regions containing a grip position, a pick-up position, a drop position, and other working positions regarding the operation object). For example, the imaging sensor 522 can include the above-mentioned cameras and ranging devices configured to generate image data and distance data of the specified regions. Based on the images and/or the ranging data captured by the imaging sensor 522, the robotic system 500 can determine, for example, the grip position, pick-up position, drop position, and/or other working positions regarding the operation object. Note that the task can include scanning the operation object to keep a log of the operation object during transportation/acceptance. In this case, the imaging sensor 522 can include one or more scanners (e.g., a bar code scanner and/or QR code scanner (registered trademark)) configured to scan identification information about the operation object during transportation of the operation object.

Also, the position sensor 524 can include a position encoder and/or a potentiometer configured to detect the position of a joint and/or a structural member in a corresponding robot unit of the robotic system 500. While performing the task, the robotic system 500 can use the position sensor 524 to track the positions and/or states (orientations, etc.) of the structural members and/or joints.

The contact sensor 526 can include, for example, a pressure sensor, a force sensor, a strain gage, a piezoresistive/piezoelectric sensor, a capacitive sensor, an elastic resistance sensor, and/or other tactile sensors configured to measure properties related to direct contact between physical structures or surfaces. In some embodiments, the contact sensor 526 can measure a property corresponding to a grip operation of the end effector with respect to an operation object. Therefore, the contact sensor 526 may be configured to detect a physical quantity that represents contact or an amount of grip between the operation object and gripper and can output a quantified measurement value (e.g., force, torque, pressure, and/or a contact reference value). Note that the contact reference value may include one or more readouts of force or torque in relation to force applied to the operation object by the end effector.

Note that although the robotic system 500 is described with respect to a warehouse and logistics system as examples, the robotic system 500 can be configured to execute various tasks in other environments or for other purposes, such as to carry out manufacture, assembly, packing, health care and/or other types of automated operation. Also, the robotic system 500 can include other units such as non-illustrated manipulators, service robots, and/or modular robots. Further, the robotic system 500 can include, for example, various types of unloading/loading robots adapted to operate in a warehouse or distribution/transportation hub. Different types of unloading/loading robots may be used to transport operation objects from various types of locations, such as from a cage cart or pallet to a conveyor or another pallet, a sorting system, an unpacking robot used to unpack operation objects, a top-opening machine, a container switching robot used to transport operation objects from one container to another, a packing robot used to pack operation objects, a packing machine, or a combination thereof.

Operation Example

Figure 6:
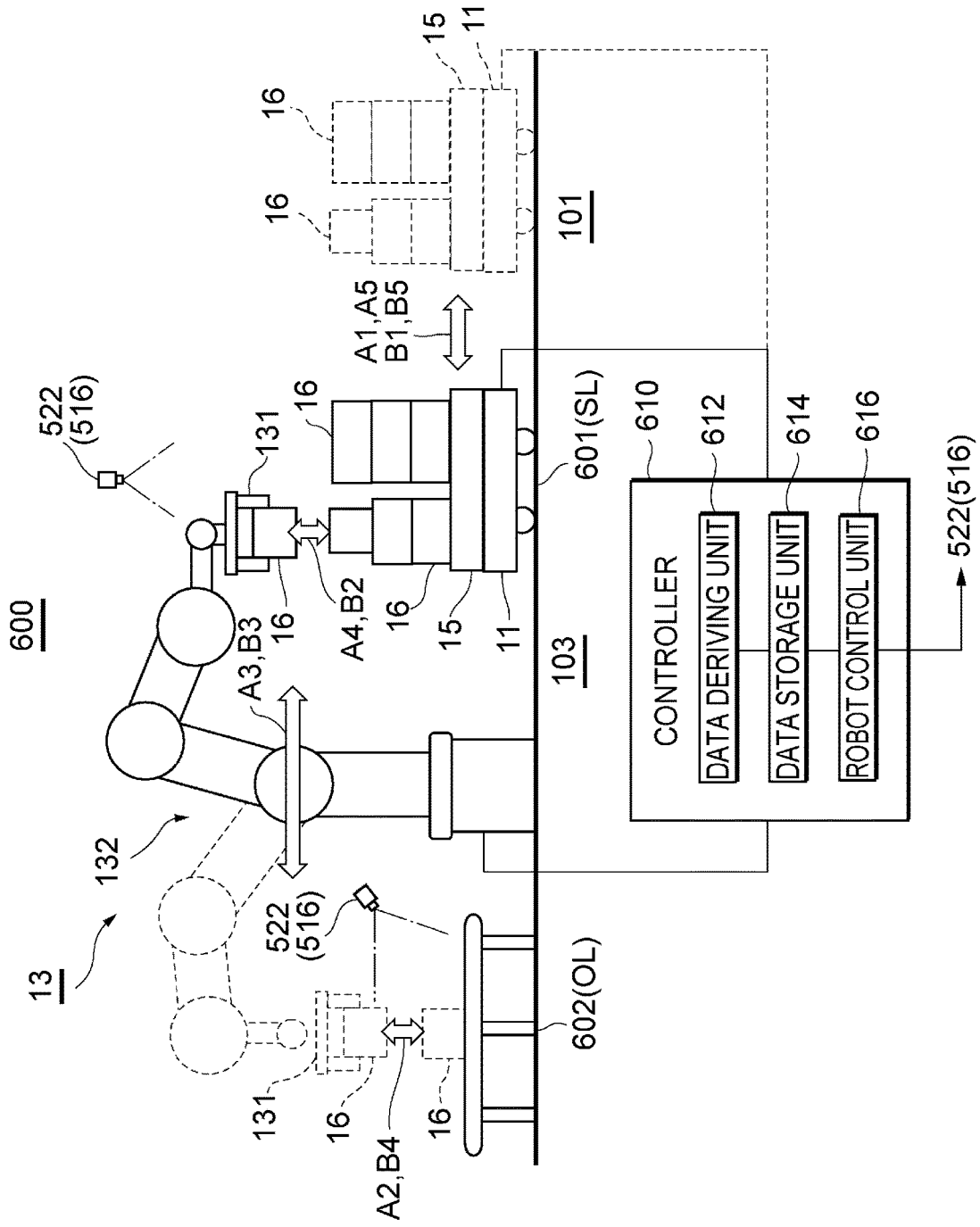
FIG. 6 is a front view (partial functional configuration diagram) showing an example of a flow of work performed by a robotic system according to one embodiment of the present technology as well as an example of a functional configuration of a controller provided on the robotic system.

FIG. 6 is a front view (partial functional configuration diagram) showing an example work flow of a robotic system according to one embodiment of the present technology. FIG. 6 further illustrates an example functional configuration of a controller provided on the robotic system. A robotic system 600 according to the present technology may be implemented, for example, in a warehouse or the like, which is a foothold for warehousing, replenishment, storage, and shipping in a logistics system. The robotic system 600 can include a controller 610 as an apparatus adapted to adjust and control operation of various units of the robotic system 600. The robotic system 600 can also be a system particularly suitable for loading of operation objects on a pallet and unloading of operation objects from the pallet in the warehousing process P10, in the warehousing process shown in FIG. 1.

As described above, the controller 610 may be configured as a stand-alone device or part of another unit. The controller 610 can adjust and control motions in tasks to be executed by units such as the transport robots 11 and 12 (the transport robot 11 is shown in FIG. 6 as an example; the same applies to the following) and the operation robots 13 and 14 (the operation robot 13 having a hand-type end effector for picking, instead of a gripper, is shown in FIG. 6; the same applies to the following), as well as units such as other robots and transport means. More specifically, the controller 610 can be communicatively coupled to the transport robot 11, the operation robot 13, and the sensor 516 including the imaging sensor 522. The controller 610 may be coupled to other non-illustrated systems or devices, such as warehouse management system (WMS), other host system, and/or external system, as needed.

The controller 610 may include a data deriving unit 612, a data storage unit 614, and a robot control unit 616. In some embodiments, the controller 610 may include the processor 502, the storage device 504, and/or the communications device 506 illustrated in FIG. 5. In particular, the processor 502 can function as the data deriving unit 612 and robot control unit 616 while the storage device 504 can function as the data storage unit 614. The robotic system 600 can be configured to execute a first task of loading operation objects 16 in a pallet 15 and/or a second task of unloading the operation objects 16 from the pallet 15.

First Task: Loading Operation Objects 16 in Pallet 15

In the first task, tasks A1 to A5 shown below can be executed in combination in an order according to corresponding timing.

A1: The pallet 15 kept in a storage area 101 may be transported from its storage location to an access position 601 (stop location SL) in a grouping area 103 by the transport robot 11.

A2: Each operation object 16 temporarily placed, for example, at a transport (output) location 602 (transport location OL) on a conveyor in the grouping area 103 may be gripped and picked up by the operation robot 13.

A3: The gripped operation object 16 may be moved from the transport location 602 to the access position 601.

A4: The operation object 16 may be loaded in a specified vacant position on the pallet 15 held at rest by the transport robot 11.

A5: The pallet 15 loaded with the operation objects 16 may be returned from the access position 601 to the storage location in the storage area 101 by the transport robot 11.

Note that in the present embodiment, the described example includes holding and moving the pallet 15 by the transport robot 11. However, the present embodiment is not limited thereto. For example, loading and unloading of the operation objects 16 may be performed in a state where the pallet 15 is placed on the ground, and/or the pallet 15 may be moved by a transport means (forklift or the like) other than the transport robot 11. Moreover, loading and unloading of the operation objects 16 may be performed in a state where the pallet 15 is placed on a conveyer. Furthermore, the pallet 15 may be transported to a predetermined point along the transport path defined by the conveyer and finally moved from the conveyer by another transport means (e.g., forklift or the like).

Figure 7:
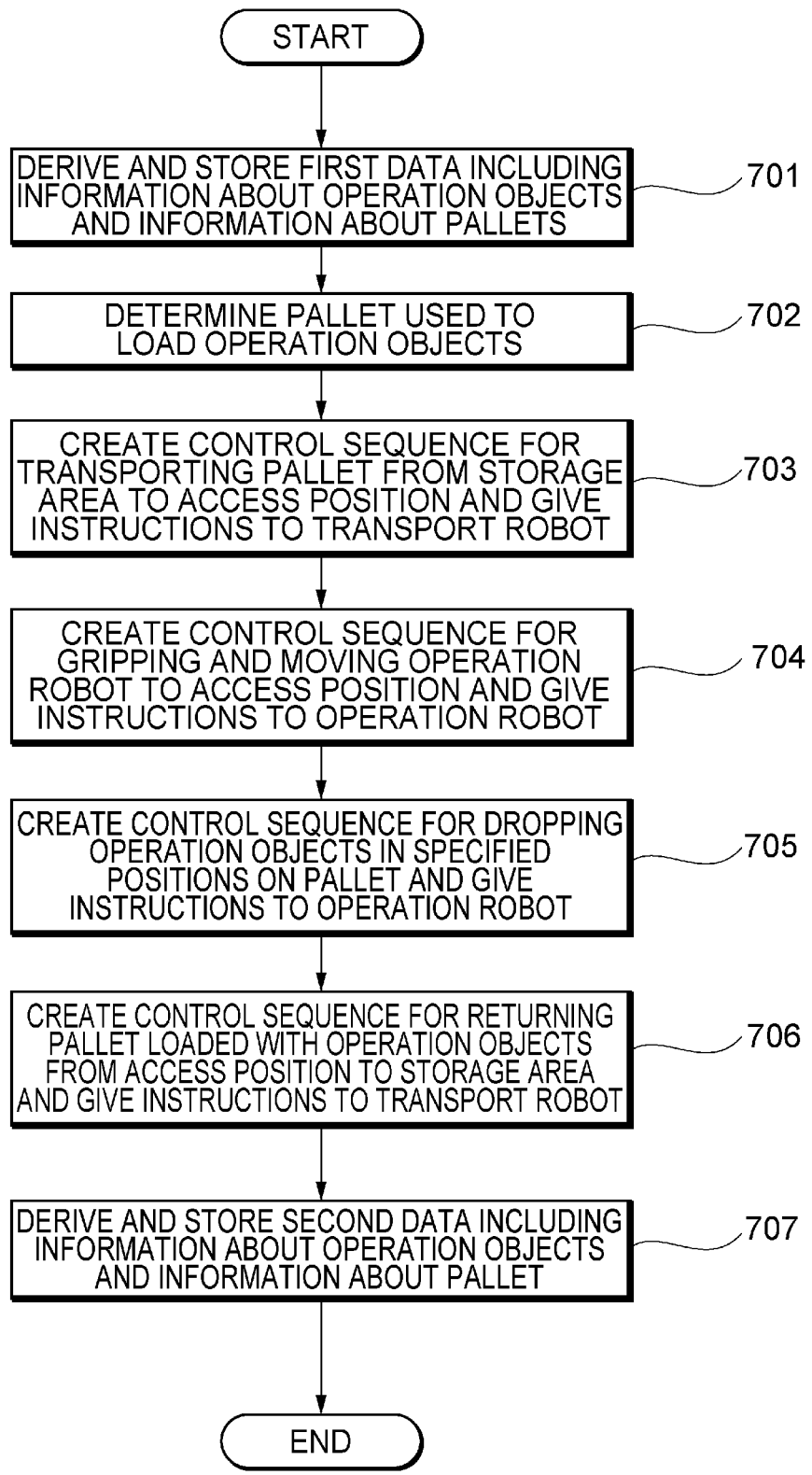
FIG. 7 is a flowchart showing an example process flow for executing a first task by operating a robotic system according to an embodiment of the present technology.

FIG. 7 is a flowchart showing an example process flow for executing the first task by operating a robotic system according to an embodiment of the present technology. First, in block 701, the data deriving unit 612 may derive first data. The first data may include information about operation objects 16 before executing the task A1 and/or information about each pallet 15. The data storage unit 614 may store the first data by associating the first data with the operation objects 16 and pallets 15.

For example, the data deriving unit 612 can obtain an image of the operation object 16 temporarily placed at the transport location 602 in the grouping area 103, via a 3D-vision or other imaging sensor 522. The data deriving unit 612 may process the obtained image to derive information about the operation object 16, such as identification, position, shape, and/or estimates of the weight and/or center of mass. The data deriving unit 612 may further derive the information about the operation object 16 based on the master data 552 as required. Alternatively or additionally, information about the operation object 16 and pallet 15 in the master data 552 can be used to estimate or pinpoint information, status, or state about the operation objects 16 and pallets 15. Note that as a technique for identifying/tracking an operation object 16, for example, methods described in Japanese Patent Applications Nos. 2019-118678 and 2019-080213, U.S. patent application Ser. No. 16/258,120, and other applications can be used. Alternatively or additionally, the data deriving unit 612 can derive information about the operation object 16 from a host system such as the WMS. The information about the operation object 16 can be derived in advance before the operation object 16 is placed at the transport location 602.

In block 702, based on the information about the operation objects 16 and information about each pallet 15, the robot control unit 616 may determine pallet information representing one of the pallets 15 on which the operation objects 16 are to be loaded. The robotic control unit 616 can select the targeted pallet based on the information about the operation objects 16 and/or the available pallets. Examples of the information about the operation objects 16 may include SKU, size, shape, weight, quantity, and the like. Examples of the information about the available pallets may include size, shape, available area, loading capacity, quantity, surface location and/or height position of previously loaded or existing operation objects on the potential pallets. The robot control unit 616 can be configured to process the information to select a candidate for the pallet 15 that increases or maximizes the storage efficiency of the entire warehouse and/or minimizes the occupied spaces of or between the operation objects 16 on the SKU basis.

The operation objects 16 having the same or similar SKUs on the pallet 15 may be arranged in a concentrated manner (e.g., by minimizing the occupied spaces of or between the objects). In some embodiments, the operation objects 16 having the same or similar SKUs may be loaded on the pallet 15 for un-mixed loading. The robotic system may also load a plurality of types of the operation objects 16 having different SKUs on a pallet for mixed loading. Loading types and/or objects may be selected based on a category or a state of the pallet 15. For example, in the case of temporarily loading the operation objects 16 on the pallet 15, the controller 610 can select the operation objects 16 to be loaded on the pallet 15 with a choice of non-mixed loading or mixed loading as appropriate. The controller 610 may further derive the loading order of the respective operation objects 16 as appropriate. In selecting/deriving the operation objects 16, the loading type, and/or the loading order, the controller 610 may process or consider operability of the operation objects 16 after the temporal loading (e.g., accessibility in unloading the ordered goods, and the like) in addition to the respective types of information described above. Moreover, it is also possible to select one or more optimum pallets 15 while considering the transport path to the grouping area 103 of the pallet 15 loaded with the operation objects 16.

Also, the controller 610 can select the operation objects 16 and load them on the pallet 15 based on, for example, the information about the pallet 15 (in particular, available area, plane, height position, and the like), regardless of the loading type (e.g., temporary loading, un-mixed loading, and/or mixed loading). Furthermore, the controller 610 may control the ratio between un-mixed loading and mixed loading. The controller 610 can adjust the degree of mixed loading on each pallet 15 based on information about (condition for) the operation objects 16. The robotic system may further arrange multiple pallets 15 on which the operation objects 16 can be loaded. The arrangement of the pallets 15 and loading operation may be performed simultaneously and/or in parallel. Moreover, the controller 610 may select a pallet 15 of more preferable condition to thereby further improve the working efficiency. Furthermore, the robotic system may temporarily place the operation objects 16 on another intermediate placing means or a temporary placing location (i.e., not the final targeted destination of the task) before loading the operation objects 16 on the pallet 15 (i.e., the final targeted destination of the task).

In block 703, the robot control unit 616 can specify the transport robot 11 used to transport the determined one or more pallets 15 from the storage area 101 to the access position 601 in the grouping area 103. The controller 610 can create or derive a control sequence, for example, by machine learning or the like. The control sequence may include a transport path of the pallet 15, such as the path intended for the transport robot 11. Based on the control sequence, the robot control unit 616 can instruct the specified transport robot 11 to execute the task A1 of transporting the pallet 15 to the access position 601.

In block 704, based on information about the operation objects 16, the robot control unit 616 may create or derive a control sequence, for example, by machine learning or the like either. The robotic control unit 616 may create or derive the control sequence simultaneously with, before, or after implementation of the task A1. The control sequence may be for picking up, gripping, and/or transferring the operation object 16 from the transport location 602 to the access position 601 using the operation robot 13. Based on the control sequence, the robot control unit 616 may instruct and control the operation robot 13 to execute the tasks A2 and A3 of gripping. Accordingly, the robotic system may move the operation object 16 to the access position 601.

The timing to execute the tasks A2 and A3 may not be specifically limited. For example, the robot control unit 616 may instruct the operation robot 13 to perform at least a part of the control sequence before the pallet 15 reaches the access position 601. In that case, before the pallet 15 reaches the access position 601, the operation robot 13 may grip and move the operation objects 16 to the access position 601 and immediately upon arrival of the pallet 15. Accordingly, the operation robot 13 can execute the task A4 of loading the operation objects 16 in the pallet 15.

In block 705, the controller 610 can obtain one or more images of the operation objects 16 and/or pallet 15 at the access position 601, such as via a 3D-vision or other imaging sensor 522. The controller 610 can process the resulting image data, and thereby determine the states and situations of the operation objects 16 and/or pallet 15. Furthermore, in block 705, the robot control unit 616 may specify positions for the operation objects on the pallet 15 based on information about the operation objects 16 and information about the pallet 15. Some examples of the processed information regarding the pallet 15 may include loading state and concentration state (e.g., density) of the operation objects 16 and/or available area on the pallet 15. Accordingly, the robotic control unit 616 may create or derive a control sequence, for example, by machine learning or the like. The control sequence may include travel paths of the operation objects 16 to the corresponding positions described above. Based on the control sequence, the robot control unit 616 can instruct the operation robot 13 to execute the task A4 of dropping the operation objects 16 at the specified positions on the pallet 15, which may held by the transport robot 11.

The robot control unit 616 can designate, for example, any position on the pallet 15 as reference coordinates for the operation robot 13 to access the pallet 15. The rest position of the pallet 15 can be calculated based on the access position 601 at which the transport robot 11 holding the pallet 15 stops. The position of the pallet 15 on the transport robot 11 may deviate from the standard position. The controller 610 can calculate positions of the transport robot 11 and pallet 15 from image data of the pallet 15 at the access position 601, and the data deriving unit 612 can derive relative positional information about the transport robot 11 and pallet 15. Then, suitably, the robot control unit 616 can correct the positional information about the pallet 15 at the access position 601 based on the relative positional information about the two. The robot control unit 616 can create or derive a control sequence for the task A4, for example, by machine learning or the like, based on the corrected positional information about the pallet 15.

Once the operation objects 16 is on the pallet 15, in block 706, the robot control unit 616 can create or derive a control sequence, for example, by machine learning or the like. The control sequence may include a transport path along which the pallet 15 loaded with the operation objects 16 may be returned from the access position 601 to the storage location in the storage area 101 via the transport robot 11. Based on the control sequence, the robot control unit 616 can instruct the transport robot 11 to execute the task A5 of transporting and returning the pallet 15 to the storage area 101.

When the above-mentioned first task of loading the operation objects 16 on the pallet 15 is completed, in block 707, the data deriving unit 612 can derive second data including information about the pallet 15 loaded with the operation objects 16 and information about the operation objects 16 on the pallet 15. The second data can include information about the loaded locations of the operation objects 16 on the pallet 15 and information about SKU thereof. The data storage unit 614 can store the second data in association with the operation objects 16 and the pallet 15.

While loading, the robot control unit 616 can create or derive a control sequence for concentrating the operation objects 16 (i.e., reducing overall space occupied by or between the objects) based on the second data. In other words, the robot control unit 616 can create or derive the control sequence such that the operation objects 16 will be placed in a concentrated manner on the pallet 15 such that unused or unoccupied space will be minimized. Based on the properties of the operation objects 16, the robot control unit 616 can create or derive, for example, a control sequence such that the operation objects 16 having the same or similar SKUs are physically grouped together (i.e., located without other objects between the similar SKUs). Also, the robotic control unit 616 can create or derive the control sequence for physically grouping the operation objects 16 having equal or similar in shape and/or size in a concentrated manner. The second data derived in this way may be updated for each operation object 16 and/or for each loading operation performed on the operation object 16. The derived second data can be used as appropriate in the second task (e.g., unloading of operation objects 16 from the pallet 15) described later.

Furthermore, based on the second data, the data storage unit 614 can store positional information (e.g., layout information) about one or more operation objects 16 on the pallet 15. The stored positional information can include two-dimensional representation for each operation object 16 and/or for each layer of the pallet 15. The stored positional information can further include three-dimensional representation of the entire pallet 15.

Also, each operation object 16 may have an identification code or an identification tag on, for example, on or about a surface thereof as identification information. The identification information about the operation object 16 can be exposed and be visible from the outside of the pallet 15 while the operation object 16 is stacked on the pallet 15. Then, by checking the identification information about the operation object 16 using the imaging sensor 522 or the like, even if the operation object 16 remains loaded on the pallet 15, the operation object 16 can be identified without manipulating the operation object 16. When the positional information about the operation objects 16 on the pallet 15 is stored as two-dimensional information or three-dimensional information, identification or determination of one of the stored operation objects 16 can directly lead to identification/determination of the remaining operation objects 16 stored on the pallet 15. Accordingly, the operation objects of each layer on the pallet 15 or each pallet 15 may be located based on identifying/locating one object thereon. Note that the imaging sensor 522 can be configured to image the pallet 15 when the transport robot 11 holding the pallet 15 is at rest and/or when the transport robot 11 holding the pallet 15 is moving.

Also, the robot control unit 616 may be configured to determine or indicate that loading of an operation object 16 on the pallet 15 is completed before the loading work (task A4) of the operation object 16 on the pallet 15 is actually finished. For example, by checking an operating state of an end effector of the operation robot 13 or by keeping track of movement of the operation object 16 using the imaging sensor 522, it can be determined that loading of the operation object 16 is completed. The robotic control unit 616 can determine or indicate earlier finished status when the entire operation object 16 or most of the operation object 16 is moved onto the pallet 15, when part of the operation object 16 touches the pallet 15.

The robotic system 600 can execute the first task (loading of operation objects 16 on the pallet 15) and the second task (unloading of operation objects 16 from the pallet 15) made up of below-mentioned unit tasks B1 to B5 to be executed in combination in appropriate order with appropriate timing.

Second Task: Unloading of Operation Objects 16 from Pallet 15

The second task can include unit tasks B1 to B5 shown below and executed in combination in appropriate order with appropriate timing.

B1: The pallet 15 kept in the storage area 101 and loaded with the operation objects 16 may be transported from the storage location to the access position 601 (stop location SL) in the grouping area 103. The pallet 15 may be transported by the transport robot 11.

B2: Each operation object 16 on the pallet 15 may be gripped and picked up by the operation robot 13.

B3: The gripped operation object 16 can be moved from the access position 601 to the transport location 602.

B4: The operation object 16 can be dropped and temporarily placed at the transport location 602.

B5: The pallet 15 that previously held the moved/unloaded operation objects 16 can be returned from the access position 601 to the storage location in the storage area 101. The pallet 15 can be returned by the transport robot 11.

Similar to the description of the first task above, the second task is described with the pallet 15 being held and moved by the transport robot 11. However, the present embodiment is not limited thereto.

Figure 8:
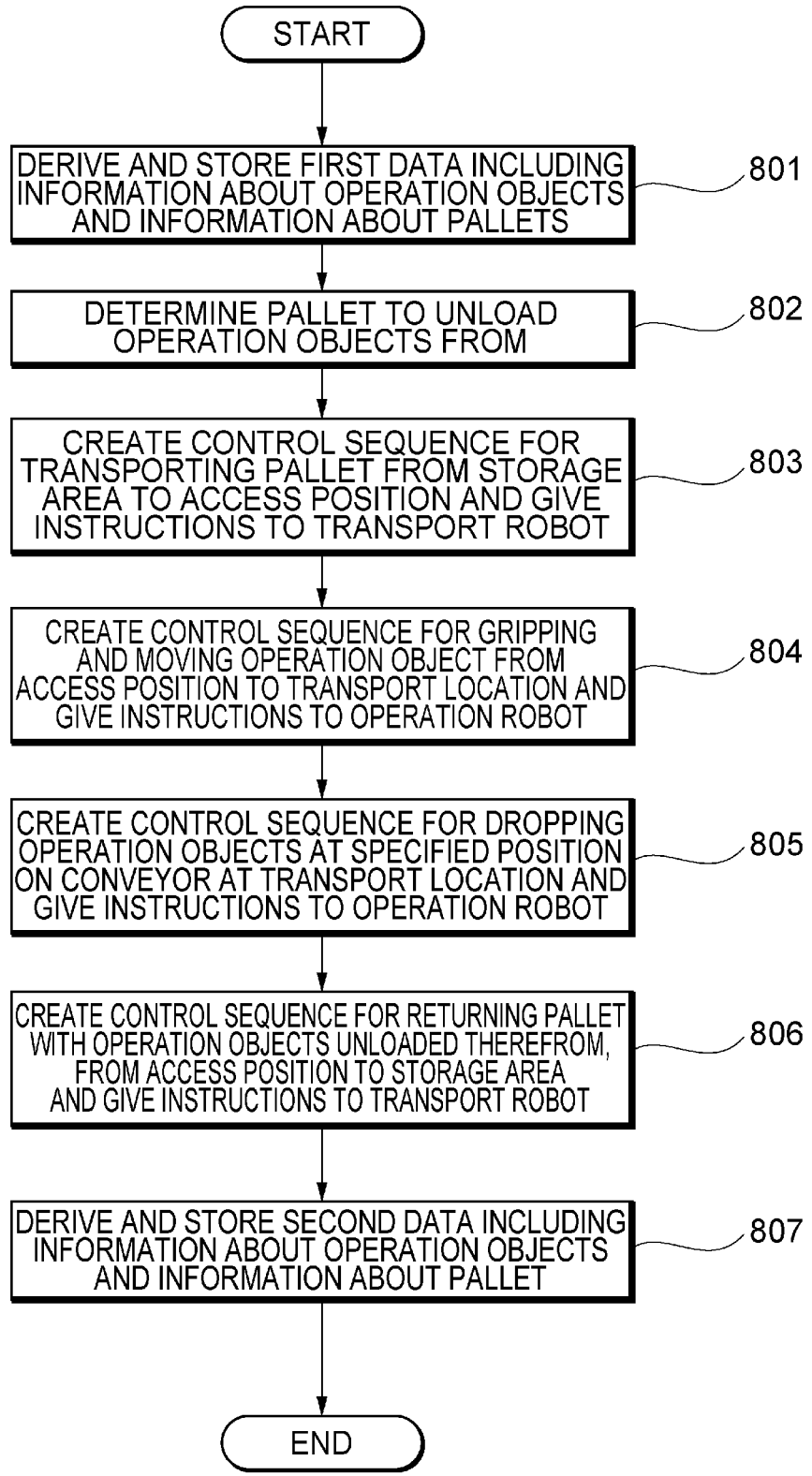
FIG. 8 is a flowchart showing an example of procedures for executing a second task by operating a robotic system according to an embodiment of the present technology.

FIG. 8 is a flowchart showing an example of procedures for executing the second task by operating a robotic system according to an embodiment of the present technology. In block 801, the data deriving unit 612 derives, for example, first data including information about operation objects 16 before executing the task B1. The data deriving unit 612 can also derive information about each pallet 15. The data storage unit 614 can store the first data by associating the first data with the operation objects 16 and pallets 15.

For example, based on the second data stored in the data storage unit 614 and/or the master data 552, the data deriving unit 612 can derive information about the operation objects 16 such as identification information, positional information, shape information, and/or information on the weight and center of mass. The data deriving unit 612 can further determine identification information and/or storage location information about the pallet 15 on which the operation objects 16 are loaded. In block 802, based on the information about the operation objects 16 and information about the pallets 15 kept in the storage area 101, the robot control unit 616 can select a pallet 15 from which the operation objects 16 are to be unloaded. The robot control unit 616 can determine one or more optimal pallets 15 according to a transport path and the like to the grouping area 103. In one embodiment, based on the above first and second data, the robot control unit 616 can determine pallet information representing the one of the pallets 15 from which the operation objects 16 are to be unloaded.

In block 803, the robot control unit 616 can specify the transport robot 11 used to transport the determined one or more pallets 15 from the storage area 101 to the access position 601 in the grouping area 103. The robot control unit 616 can create or derive a control sequence, for example, by machine learning or the like. The control sequence can include a transport path of the pallet 15 transported by the transport robot 11. Based on the control sequence, the robot control unit 616 can instruct the specified transport robot 11 to execute the task B1 of transporting the pallet 15 to the access position 601.

When an end effector of the operation robot 13 is not at the access position 601, simultaneously with, before, or after the task B1, the robot control unit 616 can instruct the operation robot 13 to execute the task of moving the end effector of the operation robot 13 to the access position 601. In this case, by completing the movement of the operation robot 13 before the pallet 15 reaches the access position 601, the operation robot 13 can execute the task B2 of unloading the operation objects 16 from the pallet 15 immediately upon arrival of the pallet 15.

When the transport robot 11 arrives at the access position 601, in block 804, the controller 610 can obtain one or more images of the operation objects 16 and pallet 15 at the access position 601, such as using a 3D-vision or other imaging sensor 522. The controller 610 can process the resulting image data, and determine the states and situations of the operation objects 16 and pallet 15. Furthermore, in block 804, based on the information about the operation objects 16 and the information about the pallet 15, the robot control unit 616 can create or derive a control sequence, for example, by machine learning or the like. The processed information about the pallet 15 can include, for example, loaded situation and the concentrated situation of the operation objects 16 on the pallet. The control sequence can include designation of the position of the operation objects 16 on the pallet 15 and/or a travel path of the end effector to the position for picking up and moving of the operation object 16 from the access position 601 to the transport location 602. Based on the control sequence, the robot control unit 616 can instruct the operation robot 13 to execute the tasks B2 and B3 of gripping the operation object 16 on the pallet 15. The pallet 15 can be held by the transport robot 11 that may be stopped at the access position 601 and/or moving to the transport location 602.

In that case, an index showing the handling property for unloading the operation objects 16 from the pallet 15 may be calculated based on the information about the operation objects 16, the information about the pallet 15 (second data), and/or the processing result of the image data. Based on the index showing the handling property, the robot control unit 616 may create or derive a control sequence by, for example, machine learning or the like. The control sequence may specify the operation objects 16 and the pallet 15 loaded with the operation objects 16. In one embodiment, based on the index, the robot control unit 616 can determine pallet information representing the one of the pallets 15 from which the operation objects 16 are to be unloaded.

Furthermore, similar to the first task, the controller 610 can determine positions of the transport robot 11 and pallet 15 from image data of the pallet 15 at the access position 601. The data deriving unit 612 can derive relative positional information about the transport robot 11 and the pallet 15. The robot control unit 616 may correct positional information about the pallet 15 at the access position 601 based on the relative positional information about the two Accordingly, the robot control unit 616 can create or derive a control sequence for the task B2, for example, by machine learning or the like, based on the corrected positional information about the pallet 15.

In block 805, the controller 610 can obtain one or more images of the operation objects 16 held at the transport location 602 as well as images of the transport location 602 (e.g., a conveyor surface and final position), such as using a 3D-vision or other imaging sensor 522. The controller 610 can process the resulting image data, and thereby determine the states and situations of the operation objects 16 and the transport location 602. Furthermore, in block 805, the robot control unit 616 can create or derive a control sequence, for example, by machine learning or the like. The control sequence can include a specified position at which the operation objects 16 are transported and/or travel paths of the operation objects 16 to the specified position. Based on the control sequence, the robot control unit 616 can instruct the operation robot 13 to execute the task B4 of dropping the operation objects 16 at the specified position in the transport location 602. Note that in directly placing the operation objects 16 in a container provided at the transport location 602, the availability of space in the container may be checked using the imaging sensor 522 to increase the storage efficiency.

When the unloading of operation objects 16 from the pallet 15 is complete, in block 806, the robot control unit 616 can create or derive a control sequence, for example, by machine learning or the like. The control sequence can include a transport path for returning the pallet 15 from which the operation objects 16 have been unloaded, from the access position 601 to the storage location in the storage area 101, such as using the transport robot 11. Based on the control sequence, the robot control unit 616 can instruct the transport robot 11 to execute the task B5 of transporting the pallet 15 to the storage area 101.

When the above-mentioned second task of unloading the operation objects 16 from the pallet 15 has been completed, in block 807, the data deriving unit 612 can derive the second data including information about the pallet 15 from which the operation objects 16 have been unloaded. The data deriving unit 612 can also derive the second data including information about the other operation objects 16 loaded on the pallet 15, including information about the loaded locations of the other operation objects 16 on the pallet 15 and information about SKU thereof. The data storage unit 614 can store the second data in association with the operation objects 16 and the pallet 15. In this way, the second data representative of the loading situation of the operation objects 16 on the pallet 15 can be updated for each operation object 16 and for each unloading operation of the operation objects 16. Also, based on the second data, the data storage unit 614 can store the positional information about multiple operation objects 16 on the pallet 15 as two-dimensional information and/or three-dimensional information for each operation object 16 and/or for each pallet 15.

Also, if the operation objects 16 have identification information on, for example, a side face, the identification information about the operation objects 16 can be checked using the imaging sensor 522 even while the operation objects 16 are stacked on the pallet 15. Thus, even if the operation objects 16 remain stacked on the pallet 15, the operation objects 16 can be identified easily by actual measurement. Furthermore, the imaging sensor 522 can be configured to image the shelf 15 when the transport robot 11 holding the pallet 15 is at rest or when the transport robot 11 holding the pallet 15 is moving.

Also, the robot control unit 616 may be configured to determine or indicate that unloading of an operation object 16 from the pallet 15 is completed before the unloading work (task B2) of the operation object 16 from the pallet 15 is actually finished. For example, by checking the operating state of an end effector of the operation robot 13 or by keeping track of movement of the operation object 16 using the imaging sensor 522, it can be determined that unloading of the operation object 16 is completed. The robot control unit 616 can determine or indicate the completion status when the entire operation object 16 or most part of the operation object 16 is moved out of the pallet 15 and/or when the entire operation object 16 or part of the operation object 16 leaves the pallet 15 or the operation object 16 loaded behind it.

The controller 610 and control method for the robotic system 500 or 600 configured as described above make it possible to grasp information about the operation objects 16 and the pallet 15 before loading or unloading the operation objects 16 on or from the pallet 15. The controller 610 can implement tasks (first and second tasks) that are based on a control sequence created or derived, for example, by machine learning or the like. The control sequence can be created or derived based on the first data including the above information. This in turn makes it possible to efficiently and smoothly perform the operation of loading the operation objects 16 on the pallet 15 or the operation of unloading the operation objects 16 from the pallet 15. In so doing, sophisticated cooperation among units of the robotic system 500 or 600 (e.g., between the transport robot 11 and operation robot 13) can be implemented, making it possible to expand the functionality of the robotic systems 500 and 600.

Other Application Example

Figure 9:
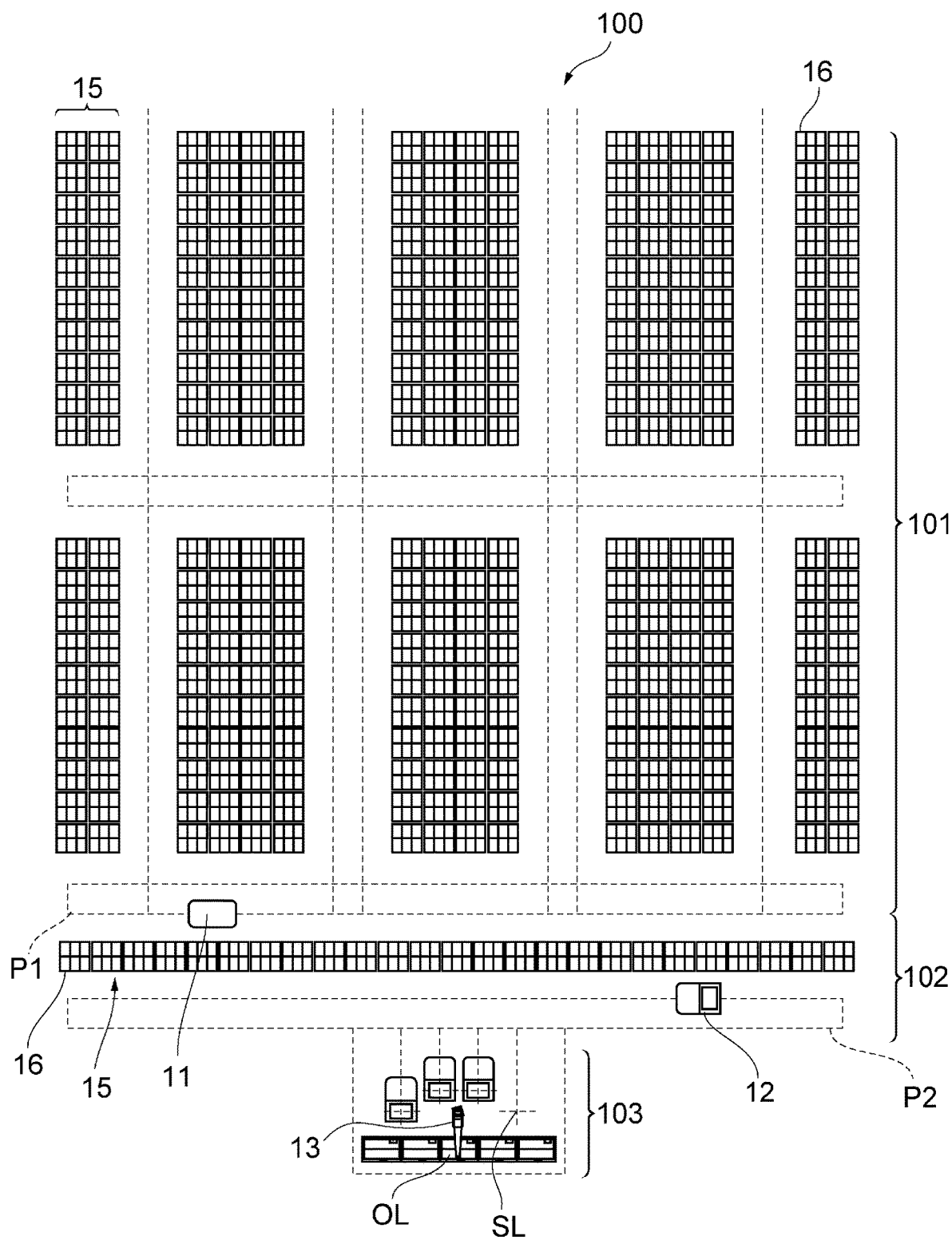
FIG. 9 is a schematic plan view showing an example environment in which a robotic system according to one embodiment of the present technology can operate.

FIG. 9 is a schematic plan view showing an example environment in which a robotic system according to one embodiment of the present technology can operate. As with the robotic system 600, a robotic system 100 can be implemented, for example, for a warehouse or the like, and implement operations for warehousing, replenishment, storage, and/or shipping in a logistics system. Also, the robotic system 100 can be configured to perform or execute one or more tasks and/or an appropriate combination of multiple tasks. The tasks can be performed or executed suitably by the robotic system 100 via one or more units (e.g., various robots, various devices, a controller provided integrally therewith or separately therefrom).

As shown in FIG. 9, the robotic system 100 can include one or more transport robots 11 and 12 (e.g., a pallet AGV) serving as a transport unit/transport units. The robotic system 100 can further include one or more operation robots 13 (e.g., piece-picking robots) serving as transporting/sorting units to move operation objects between different places. The robotic system 100 can also include a controller (not shown in FIG. 9) for the operation robots 13 and/or the transport robots 11 and 12.

To achieve predetermined purposes, the tasks executed by the robotic system 100 can be combined such that each unit will execute individual tasks in appropriate order or configured such that each unit will execute various different tasks selected as appropriate. Each unit of the robotic system 100 can execute one or more tasks to access various different items located in the storage area 101, such as on or in the pallet 15 or a container 16. The robotic system 100 can access various items according to a predetermined incoming/packing order or according to properties of the items (e.g., SKU).

The transport robot 11 can execute the task of transporting, for example, the pallets 15 in which containers 16 storing ordered items are stacked between the storage area 101 and a transportation area 102. On the other hand, the transport robot 12 can retrieve (pick up) containers 16 storing ordered items from the transported pallets 15. Also, the transport robot 12 can execute the task of transporting the containers 16 between the transportation area 102 and the grouping area 103 (an area used to group items: the stop location SL of the containers 16 in FIG. 9). The operation robot 13 can execute the task of picking up ordered items from the containers 16 in the grouping area 103 and moving the containers 16 to the transport location OL.

In executing a task, for example, when a shipment order is issued, when stored objects are rearranged, or when item replenishment is carried out, the robotic system 100 can identify different areas in which individual units and/or unit groups operate. For example, the robotic system 100 can identify the storage area 101 in which the transport robot 11 operates, the transportation area 102 in which the transport robot 12 operates, and/or the grouping area 103 in which the transport robot 12 and/or operation robot 13 operate. Note that the areas in which the transport robots 11 and 12 and operation robot 13 operate may not be limited to the areas described above. For example, the transport robot 11 may further operate in the transportation area 102 and the transport robot 12 may further operate in the storage area 101 according to an appropriate control sequence.

Also, the areas in which the units operate may be adjacent to each other or partially overlap each other. For example, the storage area 101 may be adjacent to the transportation area 102 while the transportation area 102 may partially overlap the grouping area 103. In that case, the transport robots 11 and 12 can operate in different areas by accessing the pallet 15 in the transportation area 102, for example, as shown in FIG. 9. Consequently, the robotic system 100 can reduce the possibility of potential collisions between different types of unit and/or the possibility of the different units obstructing each other. Note that the operation robot 13 can be fixed in place, making it easy for the transport robot 12 to enter the grouping area 103 without colliding with other units or causing congestion during movement.

Also, the robotic system 100 can use appropriate paths to navigate transport units such as the transport robots 11 and 12. For example, the robotic system 100 can use a first path P1 to maneuver one or more transport robots 11, and/or a second path P2 to maneuver one or more transport robots 12. In some embodiments, for example, the first path P1 and second path P2 may be separated from each other by a distance or space so as not to overlap each other as shown in FIG. 9.

Also, floor markings (e.g., painting or tape) may be provided on the first path P1 and second path P2. The transport units (e.g., the transport robots 11 and 12) can follow the floor markings when traveling by themselves. This allows the robotic system 100 to identify shapes/positions of the floor markings and use the identified information when instructing the transport units. Accordingly, the robotic system and/or the transport units can perform path calculations and/or do sequencing of positions (e.g., pick-up positions and/or drop positions of objects to be transported). Furthermore, the first path P1 and second path P2 can include a series of links (e.g., paths) and nodes (e.g., crossing positions of paths or specified positions used in changing a travel direction).

Also, the robotic system 100 can calculate efficient paths (e.g., paths associated with lowest cost metrics) that allow transport units to move between pick-up positions and/or drop positions of objects to be transported without interfering with other units. These transport units can calculate current positions on the paths using, for example, a position/navigation system and move along specified paths and routes based on the current positions.

Note that as described above, the robotic system 100 can set tasks as a series of tasks executed by multiple units. The robotic system 100 can adjust and control each of the units based on characteristics of individual tasks such that execution of an integrated task can be optimized. For example, the robotic system 100 can make adjustments such as by updating a range of operations involving units or by setting a range of operations that involves plural specified areas.

As an illustrative example, to respond to a shipment order and fulfill the order, tasks or an operation made up of an appropriate combination of integrated tasks can be executed. The tasks may include: (1) pinpointing the storage location of ordered items in the storage area 101, such as a pallet 15 loading ordered items or a pallet 15 on which a container 16 storing the ordered items is loaded; (2) transporting the pallet 15 to the transportation area 102; (3) transporting the container 16 from the pallet 15 to the grouping area 103; (4) transporting the ordered items from the container 16 to a target position such as a shipment container and/or conveyor; (5) returning the container 16 to the pallet 15; and/or (6) returning the pallet 15 to the storage area 101.

Also, to deal with warehousing of items or replenishment with items, tasks or an operation made up of an appropriate combination of integrated tasks can be executed. The tasks may include: (1) determining a container 16 capable of storing the items and a pallet 15 capable of loading the container 16 as a storage location of the items based, for example, on demand forecasting to determine an available storage location; (2) storing warehoused items or replenishment items in the container 16; (3) loading the container 16 storing the warehoused items or replenishment items into the pallet 15; and/or (4) transporting the pallet 15 to an appropriate predetermined storage location.

Also, to maneuver various units, the robotic system 100 can generate, for example, commands, control settings, motion plans, positions, identification information, paths, current positions of the units, states, progress information, or a combination thereof needed to operate actuators in the respective units. The generated information can be communicated among the individual units, and tasks can be executed by sharing the generated information among the controller and units.

Note that whereas in the above description of the robotic system 100, execution of tasks related to shipping (shipment) of items has mainly been described. In some embodiments, for example, a control sequence for operating the robotic system 100 may be applied or adjusted (e.g., by reversing the above procedures and/or via creating or deriving new results) to execute tasks related to warehousing or replenishing/restocking items.

Various Example Embodiments

Embodiment 1 may relate to a controller for a robotic system. The controller comprising: at least one processor; and at least one memory device connected to the at least one processor. The at least one memory device including instructions thereon that, when executed by the at least one processor, cause the at least one processor to implement a method for:

deriving first data and/or second data;
  the first data representing one or more operation objects and one or more pallets before loading or unloading the one or more operation objects with respect to one of the one or more pallets, and
  the second data including representing the one or more operation objects and the one or more pallets after the loading or unloading the one or more operation objects with respect to the one of the one or more pallets;

deriving a control sequence for loading and/or unloading an operation object on or from one of the one or more pallets, wherein the control sequence is derived based on the first data and/or the second data, before implementing the task of the loading and/or unloading; wherein the control sequence is configured such that operation objects that correspond to different stock keeping units are loaded on the one of the one or more pallets; and instructing an operation robot to execute a task of loading and/or unloading the operation object on and/or from the one of the one or more pallets based on the control sequence.

Embodiment 2 may include the controller of embodiment 1. In this embodiment, deriving the control sequence may include deriving the control sequence based on the first data and/or the second data such that operation objects including same or similar stock keeping units are placed on the one of the one or more pallets in a concentrated manner.

Embodiment 3 may include the controller of embodiment 1 or 2. In this embodiment, deriving the control sequence may include determining pallet information based on the first data and/or the second data, the pallet information representing the one of the one or more pallets which the operation object is to be loaded on and/or unloaded from.

Embodiment 4 may include the controller of any one of embodiments 1-3. In this embodiment, the at least one memory device may further include instructions for calculating, based on the second data, an index representing handling property for unloading the operation object from the one of the one or more pallets, and wherein deriving the control sequence may include determining pallet information based on the index, the pallet information representing the one of the one or more pallets from which the operation object is to be unloaded.

Embodiment 5 may include the controller of any one of embodiments 1-4. In this embodiment, the second data may represent positional information of the one or more operation objects loaded on the one or more pallets. The positional information comprises two-dimensional information or three-dimensional information for each operation object and/or for each pallet.

Embodiment 6 may include the controller of any one of embodiments 1-5. In this embodiment, deriving the control sequence may include deriving the control sequence for loading the operation object on the one of the one or more pallets so as to allow a sensor to measure identification information of the operation object.

Embodiment 7 may include the controller of any one of embodiments 1-6. In this embodiment, the at least one memory device may further include instructions that cause the at least one processor for determining that the loading of the operation object on the one of the one or more pallets and/or the unloading of the operation object from the one of the one or more pallets are/is completed, before the actual execution of loading and/or the unloading of the operation object are/is finished.

Embodiment 8 may relate to a tangible, non-transitory computer-readable medium including processor instructions stored thereon that, when executed by at least one processor thereof, cause the robotic system, the processor instructions comprising:

deriving first data and/or second data;
the first data representing information in connection with one or more operation objects and information in connection with one or more pallets before loading of the one or more operation objects on one of the one or more pallets and/or unloading of the one or more operation objects from one of the one or more pallets, and
the second data representing information in connection with the one or more operation objects and information in connection with the one or more pallets after the loading of the one or more operation objects on the one of the one or more pallets and/or the unloading of the one or more operation objects from the one of the one or more pallets;
deriving a control sequence for loading an operation object on one of the one or more pallets and/or unloading the operation object from one of the one or more pallets based on the first data and/or the second data, before the loading of the operation object on the one of the one or more pallets and/or the unloading of the operation object from the one of the one or more pallets; wherein the control sequence is configured such that operation objects that correspond to different stock keeping units are loaded on the one of the one or more pallets; and
instructing an operation robot for executing a task of loading the operation object on the one of the one or more pallets and/or unloading the operation object from the one of the one or more pallets based on the control sequence.

Embodiment 9 may include the tangible, non-transitory computer-readable medium of embodiment 8. In this embodiment, deriving the control sequence may include deriving the control sequence based on the first data and the second data for placing the operation objects having same or similar stock keeping units on the one of the one or more pallets in a concentrated manner.

Embodiment 10 may include the tangible, non-transitory computer-readable medium of embodiment 8 or 9. In this embodiment, deriving the control sequence may include determining pallet information, based on the first data and the second data, the pallet information representing the one of the one or more pallets which the operation object is to be loaded on and/or unloaded from.

Embodiment 11 may include the tangible, non-transitory computer-readable medium of any one of embodiments 8-10. In this embodiment, the processor instructions may further comprise calculating, based on the second data, an index representing handling property for unloading the operation object from the one of the one or more pallets, wherein deriving the control sequence may include determining pallet information based on the index, the pallet information representing the one of the one or more pallets from which the operation object is to be unloaded.

Embodiment 12 may include the tangible, non-transitory computer-readable medium of any one of embodiments 8-11. In this embodiment, the second data may represent positional information of the one or more operation objects loaded on the one or more pallets, the positional information comprising two-dimensional information or three-dimensional information for each operation object or for each pallet.

Embodiment 13 may include the tangible, non-transitory computer-readable medium of any one of embodiments 8-12. In this embodiment, deriving the control sequence may include deriving the control sequence for loading the operation object on the one of the one or more pallets so as to allow a sensor to measure identification information of the operation object.

Embodiment 14 may relate to a method for controlling a robotic system. The method may comprise:

deriving first data and/or second data;
the first data representing one or more operation objects and/or one or more pallets before loading of the one or more operation objects on one of the one or more pallets and/or unloading of the one or more operation objects from one of the one or more pallets, and
the second data representing the one or more operation objects and/or the one or more pallets after the loading of the one or more operation objects on the one of the one or more pallets and/or the unloading of the one or more operation objects from the one of the one or more pallets;

deriving a control sequence for loading an operation object on one of the one or more pallets and/or unloading the operation object from one of the one or more pallets, wherein the control sequence is derived based on the first data and the second data, and derived before the loading of the operation object on the one of the one or more pallets and/or the unloading of the operation object from the one of the one or more pallets; wherein the control sequence is configured such that operation objects that correspond to different stock keeping units are loaded on the one of the one or more pallets; and instructing, based on the control sequence, an operation robot to execute a task of loading the operation object on the one of the one or more pallets and/or unloading the operation object from the one of the one or more pallets.

Embodiment 15 may include the method of embodiment 14. In this embodiment, deriving the control sequence may include deriving the control sequence based on the first data and the second data for placing the operation objects having same or similar stock keeping units placed on the one of the one or more pallets in a concentrated manner.

Embodiment 16 may include the method of embodiment 14 or 15. In this embodiment, deriving the control sequence may include determining pallet information based on the first data and the second data, the pallet information representing the one of the one or more pallets which the operation object is to be loaded on and/or unloaded from.

Embodiment 17 may include the method of any one of embodiments 14-16. In this embodiment, the method may further comprise calculating, based on the second data, an index representing handling property for unloading the operation object from the one of the one or more pallets, wherein deriving the control sequence may include determining pallet information based on the index, the pallet information representing the one of the one or more pallets from which the operation object is to be unloaded.

Embodiment 18 may include the method of any one of embodiments 14-17. In this embodiment, the second data may represent positional information of the one or more operation objects loaded on the one or more pallets. The positional information comprises two-dimensional information or three-dimensional information for each operation object or for each pallet.

Embodiment 19 may include the method of any one of embodiments 14-18. In this embodiment, deriving the control sequence may include deriving the control sequence for loading the operation object on the one of the one or more pallets so as to allow a sensor to measure identification information of the operation object.

Embodiment 20 may include the method of any one of embodiments 14-19. In this embodiment, the method may further comprise determining a status representing loading of the operation object on the one of the one or more pallets and/or the status representing unloading of the operation object from the one of the one or more pallets are/is completed, before the loading and/or the unloading of the operation object are/is finished.

Conclusion

Whereas embodiments as examples of the present technology have been described in detail above, the above descriptions are merely illustrative of the present technology in all respects and are intended to facilitate the understanding of the present invention, but are not to be interpreted as limiting the present invention. Besides, needless to say, various improvements and modifications can be made without departing from the scope of the present technology, and the components of the embodiments as well as the arrangements, materials, conditions, shapes, sizes, and the like of the components are not limited to those illustrated above or specific ones, and may be changed as appropriate.

In other words, embodiments of the present technology do not exclude other configurations, or limit the present technology to the above embodiments. Modified forms equivalent to the embodiments of the present technology can be implemented within the scope of the present technology. For example, processes, steps, routines, or blocks can be carried out in different orders in alternative embodiments within the scope of the present technology, and some processes, steps, routines, or blocks, may be deleted, moved, added, subdivided, combined, and/or transformed within the scope of the present technology. Also, the processes, steps, routines, or blocks may be carried out by various different methods. Furthermore, even if the processes, steps, routines, or blocks are to be carried out successively in the above embodiments, the processes, steps, routines, or blocks can be carried out concurrently in some cases or may be carried out non-successively at different times. Furthermore, specific numerical figures cited herein may be different values or different ranges.

Also, the above embodiments may be carried out by many alternative methods.

Furthermore, details of the above embodiments may be changed significantly in specific modes of implementation, but are still included in the techniques of the present technology. In addition, the specific terms used to describe specific features or aspects of the present technology are not limited to specific properties, features, or aspects, or specific embodiments which are used in the present technology and with which the terms are associated, and thus the present invention is not limited to specific meanings except as defined in the appended claims. Also, whereas the present invention is defined by an arbitrary number of claims, needless to say, various aspects are expected within the scope of the present technology.

We claim:

1. A controller for controlling an operation robot to manipulate an operation object to load the operation object on a pallet and/or unload the operation object from the pallet, the controller comprising:

a data deriving unit for deriving:
   for loading the operation object on the pallet
      first data including information about the operation object and information about the pallet before loading of the operation object on the pallet; and
      second data including information about the operation object and information about the pallet after loading of the operation object on the pallet, or
   for unloading the operation object from the pallet
      first data including information about the operation object and information about the pallet before unloading of the operation object from the pallet; and
      second data including information about the operation object and information about the pallet after unloading of the operation object from the pallet;

a data storage unit for storing the first data and the second data; and a robot control unit configured to:
for loading the operation object on the pallet
create or derive a first control sequence for loading of the operation object on the pallet based on the first data before loading of the operation object on the pallet; and
instruct the operation robot to, based on the first control sequence, execute a task of loading the operation object on the pallet, or
for unloading the operation object from the pallet
create or derive a second control sequence for unloading of the operation object from the pallet based on the first data before unloading of the operation object from the pallet; and
instruct the operation robot to, based on the second control sequence, execute a task of unloading the operation object from the pallet,
wherein the robot control unit creates or derives the control sequence based on the first data or the second data such that:
a plurality of types of operation objects in which stock keeping units are different from each other are loaded on the pallet, and
operation objects having same or similar stock keeping units are placed on the pallet in a concentrated manner.

2. The controller of claim 1, wherein the robot control unit:
calculates, based on the second data after loading of the operation object on the pallet, an index indicating a handling property for unloading the operation object from the pallet, and
based on the index, creates or derives the second control sequence to include an identification of the operation object and an identification of the pallet loaded with the operation object.

3. The controller of claim 1, wherein the data storage unit stores positional information about a plurality of the operation objects on the pallet as two-dimensional information or three-dimensional information for each operation object of the plurality or for each pallet.

4. The controller of claim 1, wherein:
to create or derive the first or second control sequence, the control unit is configured to enable a sensor to obtain identification information of the operation object, and
the sensor is configured for imaging of the operation object or for imaging of the pallet loaded with the operation object.

5. The controller of claim 1, wherein:
before loading of the operation object on the pallet is finished, the control unit is configured to determine that the loading of the operation object on the pallet is complete; or
before unloading of the operation object from the pallet is finished, the control unit is configured to determine that the unloading of the operation object from the pallet is complete.

6. The controller of claim 1, wherein the data deriving unit derives actual measurement values or estimated measurement values of the operation object or of the pallet.

7. The controller of claim 1, wherein:
the controller is configured to-
identify (i) a robotic system that includes the operation robot and (ii) a region related to the robotic system, and
calculate tasks based on the first or second control sequence; and the tasks include (i) a task related to transportation of the pallet and manipulation of the operation object by the robotic system and (ii) a plurality of tasks to be executed by the robotic system across adjacent and/or overlapping regions.

8. The controller of claim 1, wherein the control unit creates or derives the first control sequence based on the first data or the second data such that operation objects having (i) a same or similar shape and/or (ii) same or similar dimensions are grouped together when placed on the pallet.

9. A tangible, non-transitory computer readable medium having processor instructions stored thereon that, when executed by one or more processors of a computer, cause the computer to perform a method for controlling an operation robot for manipulating an operation object to load the operation object on a pallet and/or unload the operation object from the pallet, and wherein the method comprises:
deriving
for loading the operation object on the pallet
first data including information about the operation object and information about the pallet before loading of the operation object on the pallet; and
second data including information about the operation object and information about the pallet after loading of the operation object on the pallet, or
for unloading the operation object from the pallet
first data including information about the operation object and information about the pallet before unloading of the operation object from the pallet; and
second data including information about the operation object and information about the pallet after unloading of the operation object from the pallet;
storing the first data and the second data;
creating or deriving
for loading the operation object on the pallet, a first control sequence for loading of the operation object on the pallet based on the first data before loading of the operation object on the pallet, or
for unloading the operation object from the pallet, a second control sequence for unloading the operation object from the pallet before unloading of the operation object from the pallet; and
instructing the operation robot to
based on the first control sequence, execute a task of loading the operation object on the pallet, or
based on the second control sequence, execute a task of unloading the operation object from the pallet,
wherein creating or deriving the control sequence includes creating or deriving the control sequence based on the first data or the second data such that:
a plurality of types of operation objects in which stock keeping units are different from each other are loaded on the pallet, and
operation objects having same or similar stock keeping units are placed on the pallet in a concentrated manner.

10. The tangible, non-transitory computer-readable medium of claim 9, wherein:
the method further comprises calculating, based on the second data after loading of the operation object on the pallet, an index indicating a handling property for unloading the operation object from the pallet, and
creating or deriving the control sequence includes creating or deriving, based on the index, the second control sequence to include an identification of the operation object and an identification of the pallet loaded with the operation object.

11. The tangible, non-transitory computer-readable medium of claim 9, wherein the method further comprises storing positional information about a plurality of the operation objects on the pallet as two-dimensional information or three-dimensional information for each operation object of the plurality or for each pallet.

12. The tangible, non-transitory computer-readable medium of claim 9, wherein:
creating or deriving the first or second control sequence includes enabling a sensor to obtain identification information of the operation object, and
the sensor is configured for imaging of the operation object or for imaging of the pallet loaded with the operation object.

13. The tangible, non-transitory computer-readable medium of claim 9, wherein the method further comprises
before loading of the operation object on the pallet is finished, determining that the loading of the operation object on the pallet is completed; or
before unloading of the operation object from the pallet is finished, determining that the unloading of the operation object from the pallet is complete.

14. The tangible, non-transitory computer-readable medium of claim 9, wherein the method further comprises deriving actual measurement values or estimated measurement values of the operation object and/or of the pallet.

15. The tangible, non-transitory computer-readable medium of claim 9, wherein creating or deriving the first control sequence includes creating or deriving the first control sequence based on the first data or the second data such that operation objects having (i) a same or similar shape and/or (ii) same or similar dimensions are grouped together when placed on the pallet.

16. A method for controlling an operation robot adapted to manipulate an operation object to load the operation object on a pallet and/or unload the operation object from the pallet, wherein the method is performed by a controller having a data deriving unit, a data storage unit, and a robot control unit, and wherein the method comprises:
deriving, using the data deriving unit
for loading the operation object on the pallet, first data including information about the operation object and the pallet before loading of the operation object on the pallet, or
for unloading the operation object from the pallet, first data including information about the operation object and the pallet before unloading of the operation object from the pallet;
storing the first data using the data storage unit;
creating or deriving, using the robot control unit and based on the first data
a first control sequence for loading the operation object on the pallet and/or before loading of the operation object on the pallet, or
a second control sequence for unloading the operation object from the pallet before unloading of the operation object from the pallet; and
instructing, using the robot control unit and based on the first or second control sequence, the operation robot to execute a task of loading the operation object on the pallet or unloading the operation object from the pallet, such that
a plurality of types of operation objects in which stock keeping units are different from each other are loaded on the pallet, and
operation objects having same or similar stock keeping units are placed on the pallet in a concentrated manner.

17. The method of claim 16, further comprising:
deriving, using the data deriving unit second including information about the operation object and the pallet after loading of the operation object on the pallet; and
calculating, using the robot control unit and based on the second data, an index indicating a handling property for unloading the operation object from the pallet,
wherein creating or deriving the second control sequence includes creating or deriving, based on the index, the second control sequence to include an identification of the operation object and an identification of the pallet loaded with the operation object.

18. The method of claim 16, further comprising storing, using the data storage unit, positional information about a plurality of the operation objects on the pallet as two-dimensional information or three-dimensional information for each operation object of the plurality of the operation objects or for each pallet.

19. The method of claim 16, wherein the creating or deriving the first control sequence includes enabling a sensor to obtain identification information of the operation object.

20. The method of claim 16, further comprising:
determining that loading of the operation object on the pallet is completed before loading of the operation object on the pallet is finished; or
determining that unloading of the operation object from the pallet is completed before unloading of the operation object from the pallet is finished.

21. The method of claim 16, further comprising deriving, using the data deriving unit, actual measurement values or estimated measurement values of the operation object or of the pallet.

22. The method of claim 16, further comprising:
identifying (i) a robotic system that includes the operation robot and (ii) a region related to the robotic system; and
calculating tasks based on the control sequence,
wherein the tasks include (i) a task related to transportation of the pallet and manipulation of the operation object by the robotic system and (ii) a plurality of tasks to be executed by the robotic system across adjacent and/or overlapping regions.

23. The method of claim 16, wherein generating the instructions for instructing the operation robot further includes generating the instructions for instructing, using the control unit and based on the first control sequence, the operation robot to execute the task of loading the operation object on the pallet such that operation objects having (i) a same or similar shape and/or (ii) same or similar dimensions are grouped together when placed on the pallet.

24. A system for controlling an operation robot, the system comprising:
a data deriving unit for deriving data for loading an operation object on a pallet, the data including information about the operation object and information about the pallet before loading of the operation object on the pallet;

a data storage unit for storing the data; and a control unit configured to:
- based on the data and before loading of the operation object on the pallet, create or derive a control sequence for loading of the operation object on the pallet, and
- generate instructions for the operation robot to, based on the control sequence, execute a task of loading the operation object on the pallet, wherein the control unit creates or derives the control sequence based on the data such that:
- a plurality of types of operation objects in which stock keeping units are different from each other are loaded on the pallet, and
- operation objects having a same stock keeping unit are grouped together when placed on the pallet.

25. The system of claim 24, wherein the control unit creates or derives the control sequence based on the data such that operation objects having (i) a same or similar shape and/or (ii) same or similar dimensions are grouped together when placed on the pallet.

* * * * *